US010725289B2

(12) United States Patent
Nakahata et al.

(10) Patent No.: US 10,725,289 B2
(45) Date of Patent: Jul. 28, 2020

(54) CASING OF OPTICAL SCANNING APPARATUS, AND OPTICAL SCANNING APPARATUS

(71) Applicant: CANON KABUSHIKI KAISHA, Tokyo (JP)

(72) Inventors: Hiroshi Nakahata, Abiko (JP); Yasuaki Otoguro, Abiko (JP); Takehiro Ishidate, Tokyo (JP); Yuta Okada, Moriya (JP); Daisuke Aruga, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 15/891,064

(22) Filed: Feb. 7, 2018

(65) Prior Publication Data
US 2018/0231768 A1      Aug. 16, 2018

(30) Foreign Application Priority Data

Feb. 15, 2017    (JP) ................................ 2017-025999

(51) Int. Cl.
*G02B 26/12* (2006.01)
*H04N 1/036* (2006.01)
(Continued)

(52) U.S. Cl.
CPC ............ *G02B 26/124* (2013.01); *B41J 2/442* (2013.01); *G02B 26/121* (2013.01);
(Continued)

(58) Field of Classification Search
CPC .. G02B 26/121; G02B 26/123; G02B 26/124; G02B 26/125; G02B 7/1821; B41J 2/442; H04N 1/036; H04N 1/113
See application file for complete search history.

(56) References Cited

U.S. PATENT DOCUMENTS 5,159,484 A * 10/1992 Yanagisawa ........... G02B 7/182
   347/257
7,072,087 B2   7/2006 Nakahata ................... 359/204.1
(Continued)

FOREIGN PATENT DOCUMENTS

JP      2001-249295       9/2001

OTHER PUBLICATIONS

U.S. Appl. No. 15/891,087, filed Feb. 7, 2018 Group Art Unit: 2872 Inventors: Hisashi Namba; Masahiro Ogura; Yosuke Murakami; Ken Katsuta; Yuta Okada Title: Light Scanning Apparatus, Housing, and Image Forming Apparatus.
(Continued)

*Primary Examiner* — Ryan D Walsh
(74) *Attorney, Agent, or Firm* — Venable LLP

(57) ABSTRACT

A casing of an optical scanning apparatus includes: a mounting portion to which a sound-insulating member is mountable; a first and a second support portions supporting a reflective mirror in the casing on which the sound-insulating member is mounted and brought into contact with a back surface of the reflective mirror; and a third and a fourth support portions supporting a reflective mirror in the casing on which the sound-insulating member is not mounted and brought into contact with a back surface of the reflective mirror, wherein the first and the second support portions are positioned between the third and the fourth support portions in a longitudinal direction of the reflective mirror, and contact portions of the third and the fourth support portions protrude toward a reflective surface side of the reflective mirror to be arranged with respect to contact portions of the first and the second support portions.

12 Claims, 11 Drawing Sheets

(51) Int. Cl.
  *H04N 1/113* (2006.01)
  *B41J 2/44* (2006.01)
  *G02B 7/182* (2006.01)

(52) U.S. Cl.
  CPC ......... *G02B 26/123* (2013.01); *G02B 26/125* (2013.01); *H04N 1/036* (2013.01); *H04N 1/113* (2013.01); *G02B 7/1821* (2013.01)

(56) References Cited

U.S. PATENT DOCUMENTS

| | | | | |
|---|---|---|---|---|
| 7,298,390 | B2 | 11/2007 | Nakahata | 347/231 |
| 7,522,326 | B1 | 4/2009 | Otoguro | 347/256 |
| 7,629,992 | B2 | 12/2009 | Nakahata | 347/243 |
| 7,684,099 | B2 | 3/2010 | Otoguro | 359/216.1 |
| 7,728,861 | B2 | 6/2010 | Nakahata | 347/231 |
| 7,830,574 | B2 * | 11/2010 | Nakatsu | B41J 2/471 359/196.1 |
| 7,830,576 | B2 | 11/2010 | Nakahata | 359/201.1 |
| 8,717,640 | B2 * | 5/2014 | Mikajiri | H04N 1/1135 250/234 |
| 8,810,622 | B2 | 8/2014 | Mamiya et al. | 347/242 |
| 8,917,305 | B2 | 12/2014 | Nakahata et al. | 347/244 |
| 8,922,847 | B2 | 12/2014 | Nakahata | 358/474 |
| 8,947,478 | B2 | 2/2015 | Ishidate et al. | 347/137 |
| 9,086,645 | B2 | 7/2015 | Otoguro et al. | G03G 15/0435 |
| 9,195,063 | B2 | 11/2015 | Ishidate et al. | G02B 26/125 |
| 9,316,992 | B2 | 4/2016 | Ishidate et al. | G03G 15/04036 |
| 9,400,444 | B2 | 7/2016 | Sato et al. | G03G 15/043 |
| 9,493,014 | B2 | 11/2016 | Aruga et al. | B41J 2/471 |
| 9,517,638 | B2 | 12/2016 | Otoguro et al. | B41J 2/471 |
| 9,522,545 | B2 * | 12/2016 | Aruga | B41J 2/451 |
| 9,720,207 | B2 | 8/2017 | Otoguro et al. | G03G 15/0435 |
| 9,772,577 | B2 | 9/2017 | Ishidate et al. | G03G 15/043 |
| 2009/0244670 | A1 | 10/2009 | Sato et al. | 359/205.1 |
| 2012/0081770 | A1 | 4/2012 | Sato et al. | 359/204.1 |
| 2012/0182367 | A1 * | 7/2012 | Masuda | B41J 2/473 347/118 |
| 2016/0152041 | A1 * | 6/2016 | Ishida | B41J 2/471 347/260 |
| 2016/0223812 | A1 * | 8/2016 | Kudo | G02B 26/125 |
| 2016/0347083 | A1 | 12/2016 | Ishidate | B41J 2/471 |
| 2017/0010558 | A1 | 1/2017 | Ishidate et al. | B41J 2/47 |
| 2017/0064108 | A1 | 3/2017 | Mamiya et al. | H04N 1/00525 |
| 2017/0336731 | A1 | 11/2017 | Ishidate et al. | G03G 15/0435 |

OTHER PUBLICATIONS

U.S. Appl. No. 15/706,317, filed Sep. 15, 2017 Group Art Unit: 2852 Inventors: Hitoshi Iwai; Shinichiro Hosoi; Takehiro Ishidate Title: Image Forming Apparatus.
U.S. Appl. No. 15/720,644, filed Sep. 29, 2017 Group Art Unit: 2852 Inventors: Shinichiro Hosoi; Takehiro Ishidate; Hitoshi Iwai Title: Image Forming Apparatus.
U.S. Appl. No. 15/801,033, filed Nov. 1, 2017 Group Art Unit: 2852 Inventors: Naoka Omura; Koichi Taniguchi; Daisuke Aruga Title: Image Forming Apparatus.
U.S. Appl. No. 15/895,818, filed Feb. 13, 2018 Group Art Unit: 2872 Inventors: Yuta Okada; Yuichiro Imai; Takehiro Ishidate; Daisuke Aruga; Yasuaki Otoguro Title: Light Scanning Apparatus and Image Forming Apparatus.
U.S. Appl. No. 15/891,071, filed Feb. 7, 2018 Group Art Unit: 3726 Inventors: Yuta Okada; Yuichiro Imai; Daisuke Aruga; Takehiro Ishidate; Yasuaki Otoguro Title: Optical Scanning Apparatus and Image Forming Apparatus.
U.S. Appl. No. 15/891,057, filed Feb. 7, 2018 Group Art Unit: 2872 Inventors: Yasuaki Otoguro; Yuichiro Imai; Yuta Okada; Daisuke Aruga; Takehiro Ishidate Title: Method for Manufacturing Light Scanning Apparatus, and Image Forming Apparatus.
U.S. Appl. No. 15/889,045, filed Feb. 5, 2018 Group Art Unit: 2828 Inventors: Yuichiro Imai Title: Light Scanning Apparatus and Image Forming Apparatus.
U.S. Appl. No. 15/889,802, filed Feb. 6, 2018 Group Art Unit: 2875 Inventors: Yuichiro Imai; Yuta Okada; Daisuke Aruga; Takehiro Ishidate; Yasuaki Otoguro Title: Light Scanning Apparatus, Image Forming Apparatus, and Housing.
U.S. Appl. No. 15/889,052, filed Feb. 5, 2018 Group Art Unit: 2872 Inventors: Takehiro Ishidate; Yasuaki Otoguro; Yuichiro Imai; Daisuke Aruga; Yuta Okada Title: Casing of a Light Scanning Apparatus, Light Scanning Apparatus, and Image Forming Apparatus.
U.S. Appl. No. 15/891,080, filed Feb. 7, 2018 Group Art Unit: 2872 Inventors: Daisuke Aruga; Hiroshi Nakahata; Yasuaki Otoguro; Takehiro Ishidate; Yuta Okada Title: Casing of Optical Scanning Apparatus and Optical Scanning Apparatus.
U.S. Appl. No. 15/908,482, filed Feb. 28, 2018 Group Art Unit: 2872 Inventors: Yuta Okada, Hitoshi Iwai, Yasuaki Otoguro Title: Leaf Spring, Housing, Light Scanning Apparatus, and Image Forming Apparatus.
U.S. Appl. No. 15/718,510, filed Sep. 28, 2017 Group Art Unit: 2878 Inventors: Masahiro Ogura; Yuichiro Imai Title: Light Scanning Apparatus.
U.S. Appl. No. 15/702,219, filed Sep. 12, 2017.
U.S. Appl. No. 15/891,087, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/895,818, filed Feb. 13, 2018.
U.S. Appl. No. 15/891,071, filed Feb. 7, 2018.
U.S. Appl. No. 15/891,057, filed Feb. 7, 2018.
U.S. Appl. No. 15/889,045, filed Feb. 5, 2018.
U.S. Appl. No. 15/889,802, filed Feb. 6, 2018.
U.S. Appl. No. 15/889,052, filed Feb. 5, 2018.
U.S. Appl. No. 15/891,080, filed Feb. 7, 2018.
U.S. Appl. No. 15/908,482, filed Feb. 28, 2018.
U.S. Appl. No. 15/718,510, filed Sep. 28, 2017.

* cited by examiner

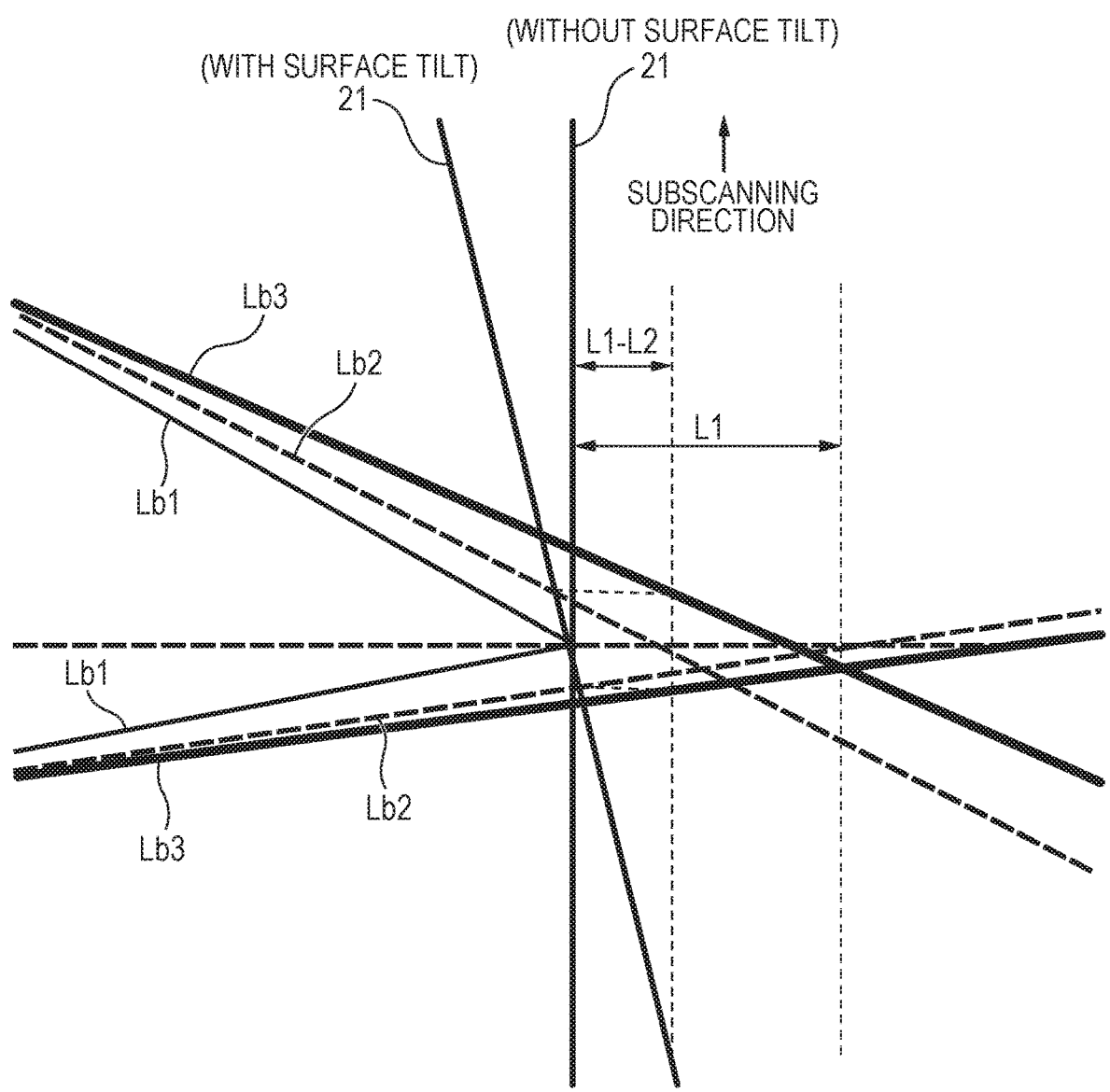

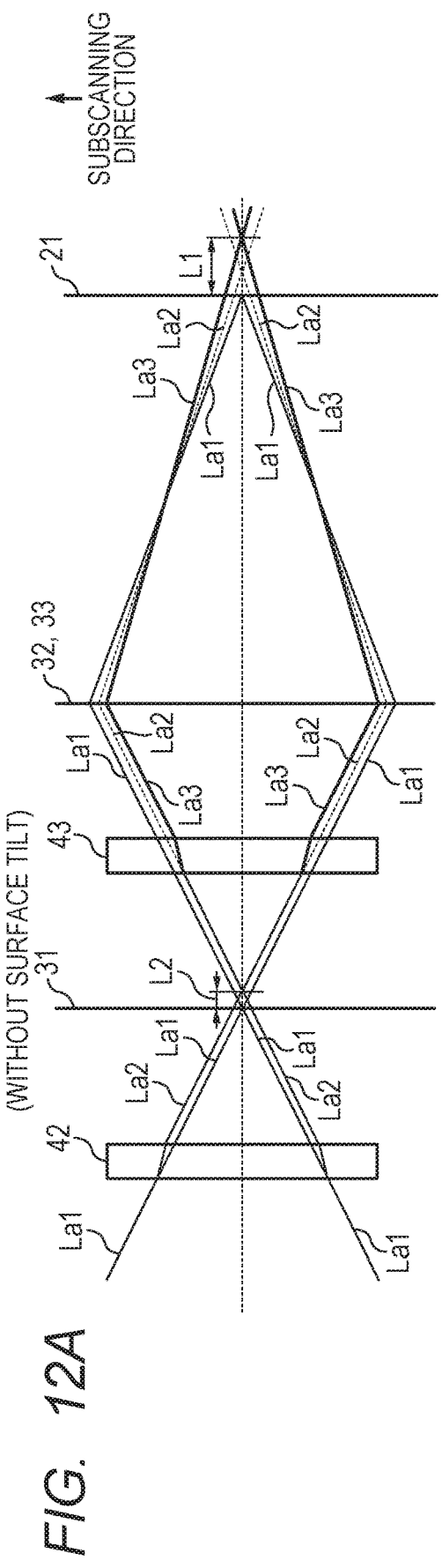
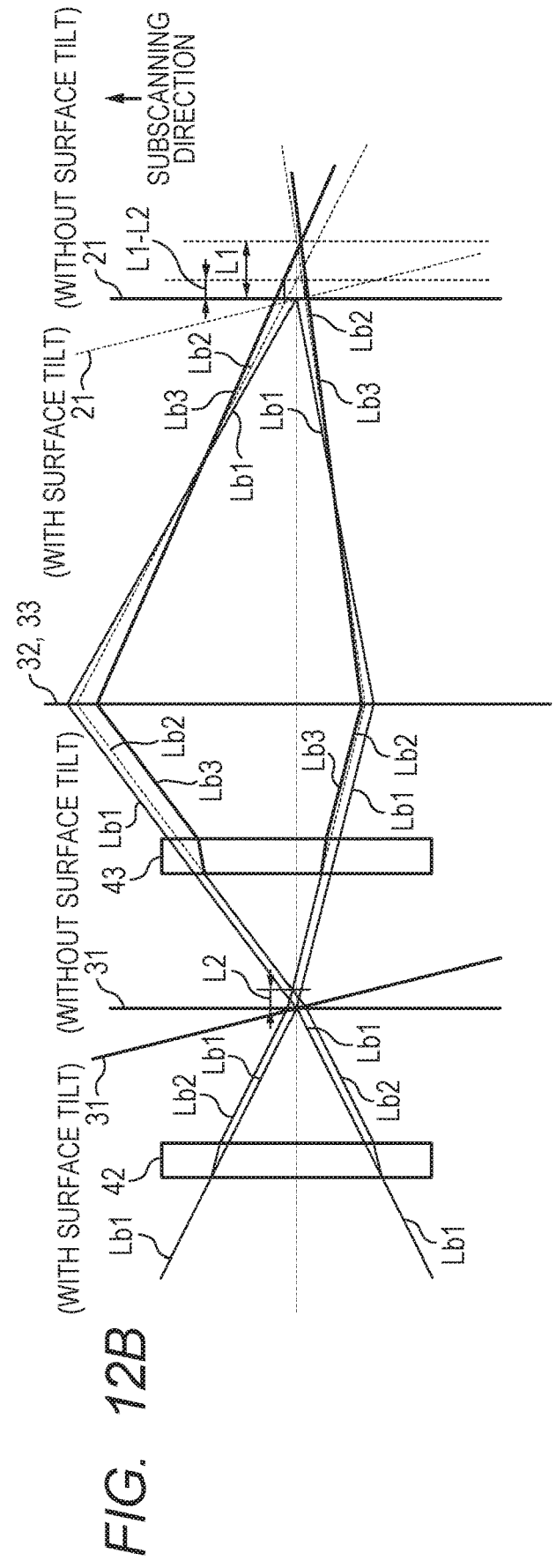
FIG. 12A
FIG. 12B

CASING OF OPTICAL SCANNING APPARATUS, AND OPTICAL SCANNING APPARATUS

BACKGROUND OF THE INVENTION

Field of the Invention

The present invention relates to an optical box of an optical scanning apparatus which is to be mounted to an image forming apparatus using an electrophotographic process, and an optical scanning apparatus including an optical box.

Description of the Related Art

There has been known an image forming apparatus, which is configured to perform image formation using an electrophotographic process and includes an optical scanning apparatus. FIG. 9 is a sectional view for illustrating a configuration of an image forming apparatus 10. The image forming apparatus 10 includes a plurality of image forming portions and is configured to print a color image on a sheet (also referred to as "recording material") using a known electrophotographic process. The image forming apparatus 10 illustrated in FIG. 9 includes four image forming portions having toner of yellow (Y), magenta (M), cyan (C), and black (K). An optical scanning apparatus 20 radiates laser light to each of photosensitive drums 21Y, 21M, 21C, and 21K based on image information transmitted from an image reading device (not shown) or a personal computer (not shown). FIG. 10 is a perspective view for illustrating a configuration of the optical scanning apparatus 20 that is mounted to the image forming apparatus 10. In the optical scanning apparatus 20, a single rotary polygon mirror 31 is provided at a center portion of a casing 35. The optical scanning apparatus 20 employs a system of exposing the photosensitive drums 21 of the plurality of image forming portions with light by using the single rotary polygon mirror 31 for the purpose of downsizing the image forming apparatus 10. Laser light emitted from each of light source units 31a and 31b is deflected by the rotary polygon mirror 31. After that, each of corresponding photosensitive drums 21 is exposed with the laser light which has passed through a scanning optical system and reflective mirrors provided for each of light sources.

The rotation speed of the rotary polygon mirror 31 is set based on a resolution, a conveyance speed of a sheet, a rotational speed of a photosensitive member, and the number of light emitting points which emit light beams for exposing the photosensitive member. That is, the rotational speed of the rotary polygon mirror 31 differs depending on a specification of a product. In a case of mounting the optical scanning apparatus 20 having the same structure with respect to a plurality of image forming apparatus having different productivity, it is required that the rotation speed of the rotary polygon mirror be suitably set in accordance with a specification of the image forming apparatus. For example, the interval of sheets to be conveyed is set equal for an image forming apparatus A with the number of outputs per minute (productivity) being 70 sheets and an image forming apparatus B with the number of outputs per minute being 50 sheets. In this case, it is required that the conveyance speed of sheets and the rotational speed of the photosensitive member for the image forming apparatus A be set higher than those for the image forming apparatus B. When the optical scanning apparatus having the same structure are mounted to the image forming apparatus A and the image forming apparatus B, in order to set intervals of scanning lines formed in respective scanning periods of light beams so as to correspond to the resolution, it is required that the rotational speed of the rotary polygon mirror be set as follows. That is, it is required that the rotational speed of the rotary polygon mirror of the image forming apparatus A be set higher than the rotational speed of the rotary polygon mirror of the image forming apparatus B.

In general, as the rotational speed of the rotary polygon mirror becomes higher, a level of noise (wind noise) caused by rotation of the rotary polygon mirror becomes higher. As a method of reducing the level of noise, there has been known a method of providing a sound-insulating wall in a casing (optical box) of an optical scanning apparatus. For example, as illustrated in FIG. 11A and FIG. 11B, there has been known a method of covering a periphery of the rotary polygon mirror 31 of the image forming apparatus A with sound-insulating members 40 and 41, to thereby cause noise to be less liable to leak out from the casing of the optical scanning apparatus. The sound-insulating member 40 has a transparent window 43a and a transparent window 43b (on a side opposite to the transparent window 43a) for allowing the laser light having been deflected by the rotary polygon mirror 31 to pass therethrough. The sound-insulating member 40 may have transparent windows 42a and 42b for allowing passage of laser light which is emitted from each of the light source units 31a and 31b and proceeds to the rotary polygon mirror 31. The sound-insulating member 40 is not provided to the image forming apparatus B. Therefore, the transparent windows 43a and 43b are not present in the image forming apparatus B.

When the optical scanning apparatus having the same structure except for the presence or absence of the sound-insulating members are employed in the image forming apparatus A and B, the following problem may arise. That is, due to the influence of the transparent windows 43 of the sound-insulating member 40, optical deviation (deviation in focal point and deviation in conjugate point) as illustrated in FIG. 12A and FIG. 12B occurs. Detailed description of FIG. 9 to FIG. 12A and FIG. 12B is made later. With respect to such deviation in focal point and deviation in conjugate point, for example, in Japanese Patent Application Laid-Open No. 2001-249295, there has been proposed a casing of an optical scanning apparatus, which is capable of adjusting a mounting position of a rotary polygon mirror to enable adjustment of an optical path length.

According to the comparative art, a position of the rotary polygon mirror differs in accordance with presence or absence of the sound-insulating member, and hence there has been proposed a configuration in which a positioning hole for mounting the rotary polygon mirror to the casing of the optical scanning apparatus is replaceable. However, according to this configuration, a segment provided at a portion for positioning the rotary polygon mirror is replaced and formed in accordance with the presence or absence of the sound-insulating member. Therefore, a relative positional relationship between the rotary polygon mirror and each optical component of a scanning optical system for introducing the light beam, which is deflected by the rotary polygon mirror, onto the photosensitive member is changed. As a result, an optical performance of the optical scanning apparatus mounted to an image forming apparatus having at least one of the above-mentioned specification is degraded. When an electrical correction processing unit is mounted to the image forming apparatus to compensate for the degradation in optical performance, the cost merit of sharing the optical scanning apparatus for image forming apparatus having different specifications is reduced.

SUMMARY OF THE INVENTION

The present invention has been made under such a circumstance, and has an object to secure stable optical performance regardless of presence or absence of a sound-insulating member which covers a rotary polygon mirror.

In order to solve the above-mentioned problems, according to embodiments of the present invention, the following structures are provided.

(1) According to one embodiment of the present invention, there is provided a casing an optical scanning apparatus, which is configured to accommodate a rotary polygon mirror including a plurality of reflective surfaces and configured to deflect a light beam emitted from a light source, and an optical member including at least part of an imaging lens configured to image the light beam having been deflected by the rotary polygon mirror on a photosensitive member and a reflective mirror configured to introduce the light beam having been deflected by the rotary polygon mirror to the photosensitive member, the casing including: a mounting portion to which a sound-insulating member is mountable, wherein the sound-insulating member separates an arrangement space of the optical member and an arrangement space of the rotary polygon mirror, is configured to reduce propagation of sound generated by rotation of the rotary polygon mirror from the arrangement space of the rotary polygon mirror to the arrangement space of the optical member, and has a transparent window configured to allow the light beam having been deflected by the rotary polygon mirror to be emitted from the arrangement space of the rotary polygon mirror to the arrangement space of the optical member; a first support portion and a second support portion configured to support a reflective mirror in the casing of an optical scanning apparatus on which the sound-insulating member is mounted, the first support portion being configured to support one end of the reflective mirror configured to introduce the light beam to the photosensitive member and being brought into contact with a back surface of a reflective surface of the reflective mirror, the second support portion being configured to support another end of the reflective mirror and being brought into contact with the back surface of the reflective surface of the reflective mirror; and a third support portion and a fourth support portion configured to support a reflective mirror in the casing of an optical scanning apparatus on which the sound-insulating member is not mounted, the third support portion being configured to support one end of the reflective mirror configured to introduce the light beam to the photosensitive member and being brought into contact with a back surface of a reflective surface of the reflective mirror, the fourth support portion being configured to support another end of the reflective mirror and being brought into contact with the back surface of the reflective surface of the reflective mirror, wherein the first support portion and the second support portion are positioned between the third support portion and the fourth support portion in a longitudinal direction of the reflective mirror to be arranged, and wherein contact portions of the third support portion and the fourth support portion which are brought into contact with the reflective mirror protrude toward a reflective surface side of the reflective mirror to be arranged with respect to contact portions of the first support portion and the second support portion which are brought into contact with the reflective mirror so that a path length of the light beam, from the light source to a surface of the photosensitive member, which is formed by the reflective mirror supported by the first support portion and the second support portion is set longer than a path length of the light beam, from the light source to the surface of the photosensitive member, which is formed by the reflective mirror supported by the third support portion and the fourth support portion.

(2) According to one embodiment of the present invention, there is provided a casing of an optical scanning apparatus, which is configured to accommodate a rotary polygon mirror including a plurality of reflective surfaces and configured to deflect a light beam emitted from a light source, and an optical member including at least part of an imaging lens configured to image the light beam having been deflected by the rotary polygon mirror on a photosensitive member and a reflective mirror configured to introduce the light beam having been deflected by the rotary polygon mirror to the photosensitive member, the casing including: a mounting portion to which a sound-insulating member is mountable, wherein the sound-insulating member separates an arrangement space of the optical member and an arrangement space of the rotary polygon mirror, is configured to reduce propagation of sound generated by rotation of the rotary polygon mirror from the arrangement space of the rotary polygon mirror to the arrangement space of the optical member, and has a transparent window configured to allow the light beam having been deflected by the rotary polygon mirror to be emitted from the arrangement space of the rotary polygon mirror to the arrangement space of the optical member; a first support portion and a second support portion configured to support a reflective mirror in the casing of an optical scanning apparatus on which the sound-insulating member is mounted, the first support portion being configured to support one end of the reflective mirror configured to introduce the light beam to the photosensitive member and being brought into contact with a surface of the reflective mirror on a reflective surface side, the second support portion being configured to support another end of the reflective mirror and being brought into contact with the surface of the reflective mirror on the reflective surface side; and a third support portion and a fourth support portion configured to support a reflective mirror in the casing of an optical scanning apparatus on which the sound-insulating member is not mounted, the third support portion being configured to support one end of the reflective mirror configured to introduce the light beam to the photosensitive member and being brought into contact with a surface of the reflective mirror on a reflective surface side, the fourth support portion being configured to support another end of the reflective mirror and being brought into contact with the surface of the reflective mirror on the reflective surface side; wherein the third support portion and the fourth support portion are positioned between the first support portion and the second support portion in a longitudinal direction of the reflective mirror to be arranged, and wherein contact portions of the first support portion and the second support portion which are brought into contact with the reflective mirror protrude toward a back surface side of the reflective mirror to be arranged with respect to contact portions of the third support portion and the fourth support portion which are brought into contact with the reflective mirror so that a path length of the light beam, from the light source to a surface of the photosensitive member, which is formed by the reflective mirror supported by the first support portion and the second support portion is set longer than a path length of the light beam, from the light source to the surface of the photosensitive member, which is formed by the reflective mirror supported by the third support portion and the fourth support portion.

(3) According to one embodiment of the present invention, there is provided an optical scanning apparatus, including: a casing configured to accommodate a rotary polygon mirror including a plurality of reflective surfaces and configured to deflect a light beam emitted from a light source, and an optical member including at least part of an imaging lens configured to image the light beam having been deflected by the rotary polygon mirror on a photosensitive member and a reflective mirror configured to introduce the light beam having been deflected by the rotary polygon mirror to the photosensitive member, a mounting portion to which a sound-insulating member is mountable, wherein the sound-insulating member separates an arrangement space of the optical member and an arrangement space of the rotary polygon mirror, is configured to reduce propagation of sound generated by rotation of the rotary polygon mirror from the arrangement space of the rotary polygon mirror to the arrangement space of the optical member, and has a transparent window configured to allow the light beam having been deflected by the rotary polygon mirror to be emitted from the arrangement space of the rotary polygon mirror to the arrangement space of the optical member; a first support portion and a second support portion configured to support a reflective mirror in the casing of an optical scanning apparatus on which the sound-insulating member is mounted, the first support portion being configured to support one end of the reflective mirror configured to introduce the light beam to the photosensitive member and being brought into contact with a back surface of a reflective surface of the reflective mirror, the second support portion being configured to support another end of the reflective mirror and being brought into contact with the back surface of the reflective surface of the reflective mirror; and a third support portion and a fourth support portion configured to support a reflective mirror in the casing of an optical scanning apparatus on which the sound-insulating member is not mounted, the third support portion being configured to support one end of the reflective mirror configured to introduce the light beam to the photosensitive member and being brought into contact with a back surface of a reflective surface of the reflective mirror, the fourth support portion being configured to support another end of the reflective mirror and being brought into contact with the back surface of the reflective surface of the reflective mirror, wherein the mounting portion, the first support portion, the second support portion, the third support portion, and the fourth support portion are formed in the casing, wherein the first support portion and the second support portion are positioned between the third support portion and the fourth support portion in a longitudinal direction of the reflective mirror to be arranged, and wherein contact portions of the third support portion and the fourth support portion which are brought into contact with the reflective mirror protrude toward a reflective surface side of the reflective mirror to be arranged with respect to contact portions of the first support portion and the second support portion which are brought into contact with the reflective mirror so that a path length of the light beam, from the light source to a surface of the photosensitive member, which is formed by the reflective mirror supported by the first support portion and the second support portion is set longer than a path length of the light beam, from the light source to the surface of the photosensitive member, which is formed by the reflective mirror supported by the third support portion and the fourth support portion.

According to the present invention, the stable optical performance can be secured regardless of presence or absence of the sound-insulating member which covers the rotary polygon mirror.

Further features of the present invention will become apparent from the following description of exemplary embodiments with reference to the attached drawings.

BRIEF DESCRIPTION OF THE DRAWINGS

FIG. 7 is a view for illustrating a change in focal point and conjugate point in accordance with presence or absence of a sound-insulating member in the embodiment.

FIG. 12A is an explanatory view for illustrating a change in focal point and conjugate point in accordance with presence or absence of the sound-insulating members of the comparative example.

FIG. 12B is an explanatory view for illustrating a change in focal point and conjugate point in accordance with presence or absence of the sound-insulating members of the comparative example.

DESCRIPTION OF THE EMBODIMENTS

Now, details of an embodiment of the present invention is described with reference to the drawings.

[Configuration of Image Forming Apparatus]

Figure 9:
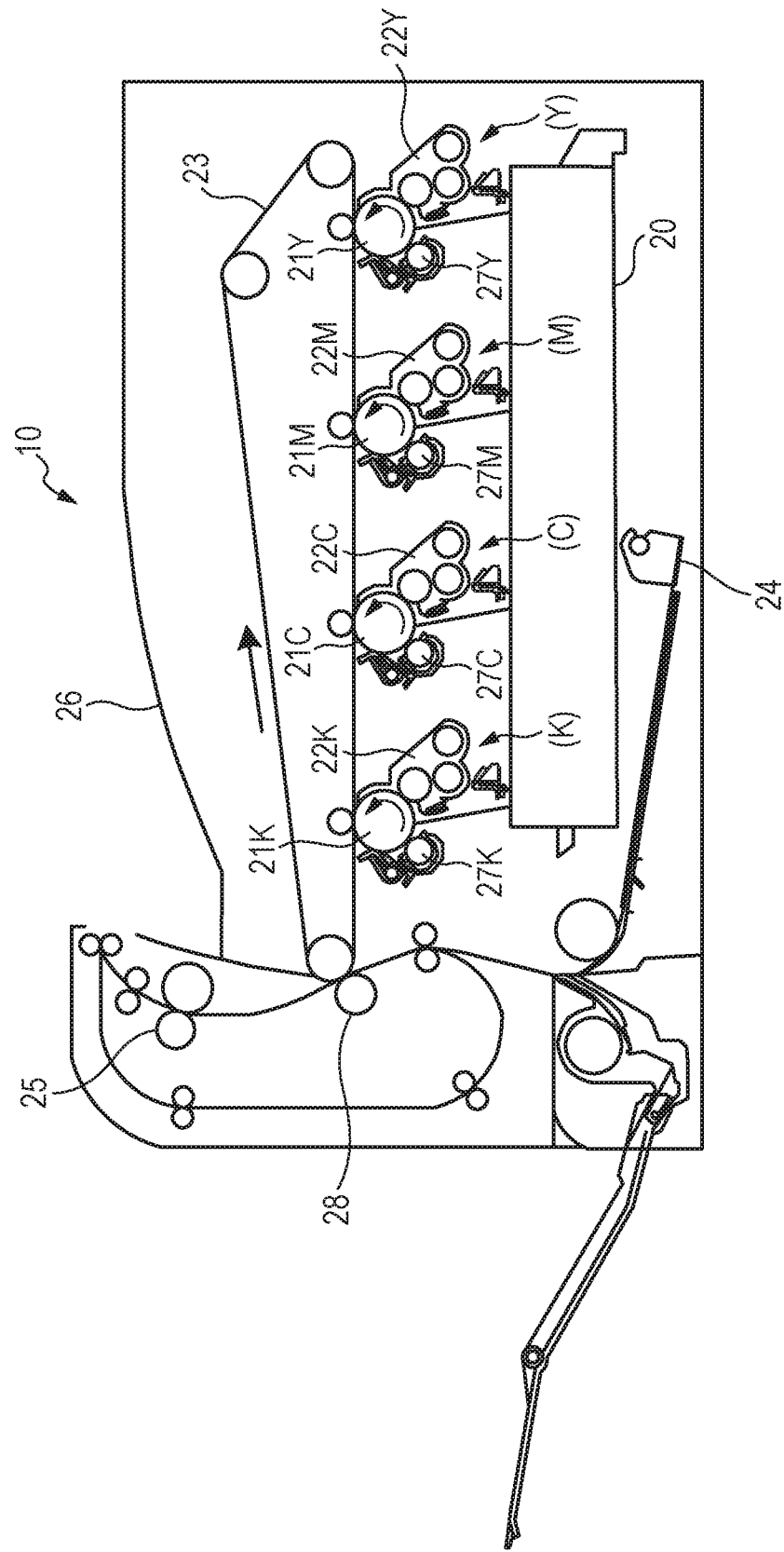
FIG. 9 is a sectional view for illustrating a configuration of an image forming apparatus of a comparative example.

For comparison with the embodiment, an image forming apparatus and an optical scanning apparatus of a comparative example are described with reference to FIG. 9 to FIG. 12A and FIG. 12B. FIG. 9 is a sectional view for illustrating a configuration of an image forming apparatus 10. The image forming apparatus 10 includes a plurality of image forming portions, and is configured to print a color image on a sheet (also referred to as "recording medium") through use of a known electrophotographic process. The image forming apparatus 10 illustrated in FIG. 9 includes four image forming portions using toners of, from the right side in FIG. 9, yellow (Y) (indicated by (Y) in FIG. 9), magenta (M) (indicated by (M) in FIG. 9), cyan (C) (indicated by (C) in FIG. 9), and black (K) (indicated by (K) in FIG. 9). In the following description, reference symbols Y, M, C, and K indicating colors of toner are omitted unless otherwise necessary. One image forming portion includes a photosensitive drum 21 being a photosensitive member, a developing device 22, and a charging device 27, and the image forming portions have the same configuration. An optical scanning apparatus 20 exposes the photosensitive drum 21 with laser light based on image information transmitted from an image reading device (not shown) or a personal computer (not shown). The optical scanning apparatus 20 includes light emitting sources corresponding to the image forming portions so as to expose the photosensitive drums 21 of the respective image forming portions with light.

The photosensitive drum 21 which is formed by applying a photosensitive layer to a conductive body is charged to a predetermined potential by the charging device 27. An electrostatic latent image is formed on a surface of the photosensitive drum 21 by laser light emitted from the optical scanning apparatus 20. The developing device 22 causes toner, which has been charged by friction, to adhere to an electrostatic latent image on the photosensitive drum 21 to develop the electrostatic latent image, thereby forming a toner image. The toner images formed on the photosensitive drums 21 are transferred to an intermediate transfer belt 23. A sheet-feeding cassette 24 stores a sheet to which the toner images on the intermediate transfer belt 23 are transferred. The sheet fed from the sheet-feeding cassette 24 is conveyed to transfer rollers 28, and the toner images formed on the intermediate transfer belt 23 are transferred to the sheet by the transfer rollers 28. A fixing device 25 heats and pressurizes the toner images having been transferred to the sheet, to thereby fix the toner images on the sheet. The sheet on which the toner images have been fixed by the fixing device 25 is delivered to a delivery tray 26. The embodiment is not limited to the color image forming apparatus, and may be a monochromatic image forming apparatus.

[Configuration of Optical Scanning Apparatus]

Figure 10:
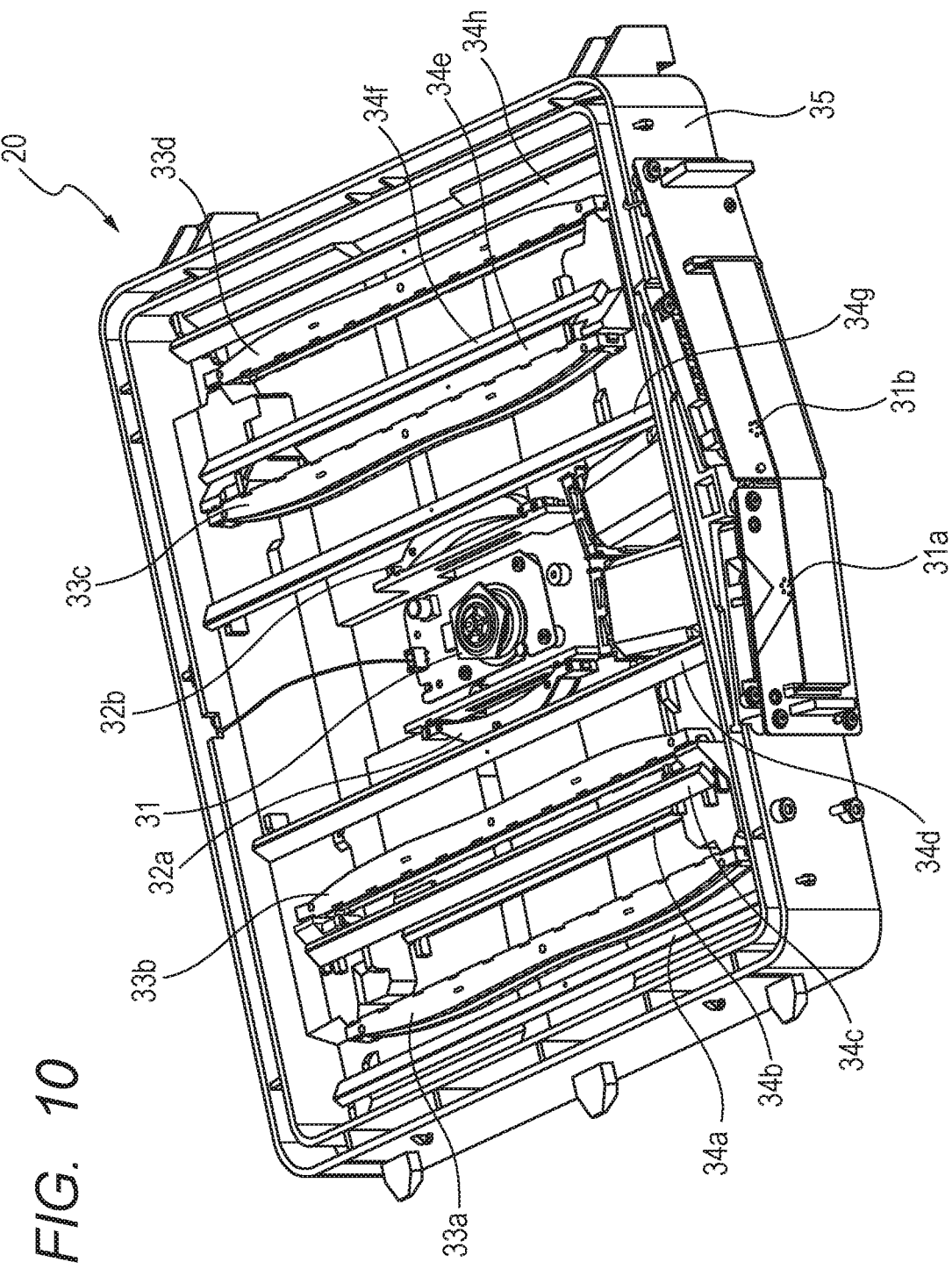
FIG. 10 is a perspective view for illustrating a configuration of an optical scanning apparatus of a comparative example.

FIG. 10 is a perspective view for illustrating a configuration of the optical scanning apparatus 20 which is mounted to the image forming apparatus 10. The optical scanning apparatus 20 illustrated in FIG. 10 employs a system of exposing the photosensitive drums 21 of the plurality of image forming portions with light by using a single rotary polygon mirror 31 for the purpose of downsizing the image forming apparatus 10. In FIG. 10, the rotary polygon mirror 31 to be used in common by the plurality of image forming portions is provided at a center portion of the optical scanning apparatus 20. Laser light emitted from each of light source units 31a and 31b is deflected by the rotary polygon mirror 31. After that, a surface of the corresponding photosensitive drum 21 is exposed with the laser light which has passed through a scanning optical system and reflective mirrors provided for each of the light sources. In the optical scanning apparatus 20, optical systems are arranged respectively in the right-left direction of FIG. 10 with respect to the rotary polygon mirror 31. Each of the light source units 31a and 31b includes light emitting portions for two colors of toner. Each of the photosensitive drums 21K and 21C of the image forming portions corresponding to black (K) and cyan (C) is exposed with laser light emitted from the light source unit 31a. Each of the photosensitive drums 21M and 21Y of the image forming portions corresponding to magenta (M) and yellow (Y) is exposed with laser light emitted from the light source unit 31b.

Each of the light source units 31a and 31b includes a semiconductor laser (not shown), a collimator lens configured to convert the laser light emitted from the semiconductor laser into collimated light, and a cylindrical lens configured to image the laser light in a linear shape on the rotary polygon mirror 31. The laser light passes through first imaging lenses 32a and 32b and second imaging lenses 33a, 33b, 33c, and 33d, which are configured to scan the laser light at a constant speed and form an image on the photosensitive drum 21. The laser light passes through the first and second imaging lenses of the scanning optical system. After that, the laser light proceeds to reflective mirrors 34a, 34b, 34c, 34d, 34e, 34f, 34g, and 34h, which are configured to reflect (fold) the laser light in a predetermined direction in order to introduce the laser light to the photosensitive drums 21 of the corresponding image forming portions, thereby forming electrostatic latent images on the photosensitive drums 21. The optical scanning apparatus 20 includes a casing 35 (also referred to as "optical box 35") accommodating the components illustrated in FIG. 10, and an opening portion at the upper portion of the optical scanning apparatus 20 is tightly sealed by a lid (not shown).

[Measures Against Noise of Rotary Polygon Mirror]

The rotation speed of the rotary polygon mirror 31 is set based on a resolution, a conveyance speed of a sheet, a rotational speed of the photosensitive drum 21, and the number of light emitting points which emit light beams for exposing the photosensitive drum 21. That is, the rotational speed of the rotary polygon mirror 31 differs based on a specification of a product. The optical scanning apparatus 20 having the same structure are mounted to a plurality of image forming apparatus having different productivity. In this case, it is required that the rotational speed of the rotary polygon mirror be suitably set in accordance with a specification of the image forming apparatus. For example, with regard to an image forming apparatus A with the number of outputs per minute (productivity) being 70 sheets and an image forming apparatus B with the number of outputs per minute being 50 sheets, when the interval of sheets to be conveyed is set equal, the speeds are set as follows. That is, it is required that the conveyance speed of sheets and the rotational speed of the photosensitive drum 21 for the image forming apparatus A be set higher than those for the image forming apparatus B. In this occasion, the optical scanning apparatus 20 having the same structure are mounted to the image forming apparatus A and the image forming apparatus B. In this case, in order to set intervals of scanning lines formed in respective scanning periods of light beams so as to correspond to the resolution, it is required that the rotational speed of the rotary polygon mirror 31 be set as follows. That is, it is required that the rotational speed of the rotary polygon mirror 31 of the image forming apparatus A be set higher than the rotational speed of the rotary polygon mirror 31 of the image forming apparatus B. In general, as the rotational speed of the rotary polygon mirror 31 becomes higher, a level of noise (wind noise) caused by rotation of the rotary polygon mirror 31 becomes higher.

As a method of suppressing increase in rotation speed of the rotary polygon mirror 31, there has been generally known an approach of increasing the number of beams of semiconductor lasers to be used in the light source units 31a and 31b. However, when a semiconductor laser having the number of beams larger than that of a semiconductor laser which is widely available in public is used, cost significantly increases. Further, there exists no semiconductor laser which is applicable to a case of improving both the resolution and productivity, and mere increase in number of beams of the semiconductor laser cannot deal with such a case. In order to deal with such case, it is required to increase the rotation speed of the rotary polygon mirror 31. However, there arises a problem of the level of noise generated from the rotary polygon mirror 31.

Figure 11A:
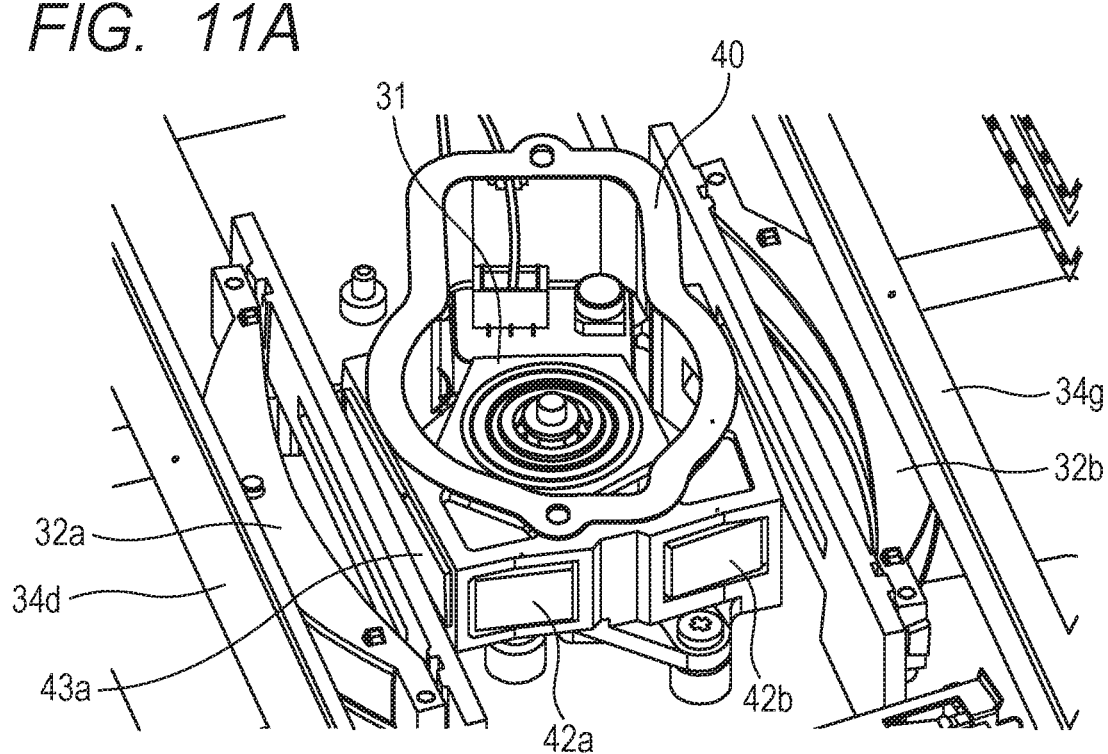
FIG. 11A is an explanatory view for illustrating sound-insulating members of a rotary polygon mirror of the comparative example.
Figure 11B:
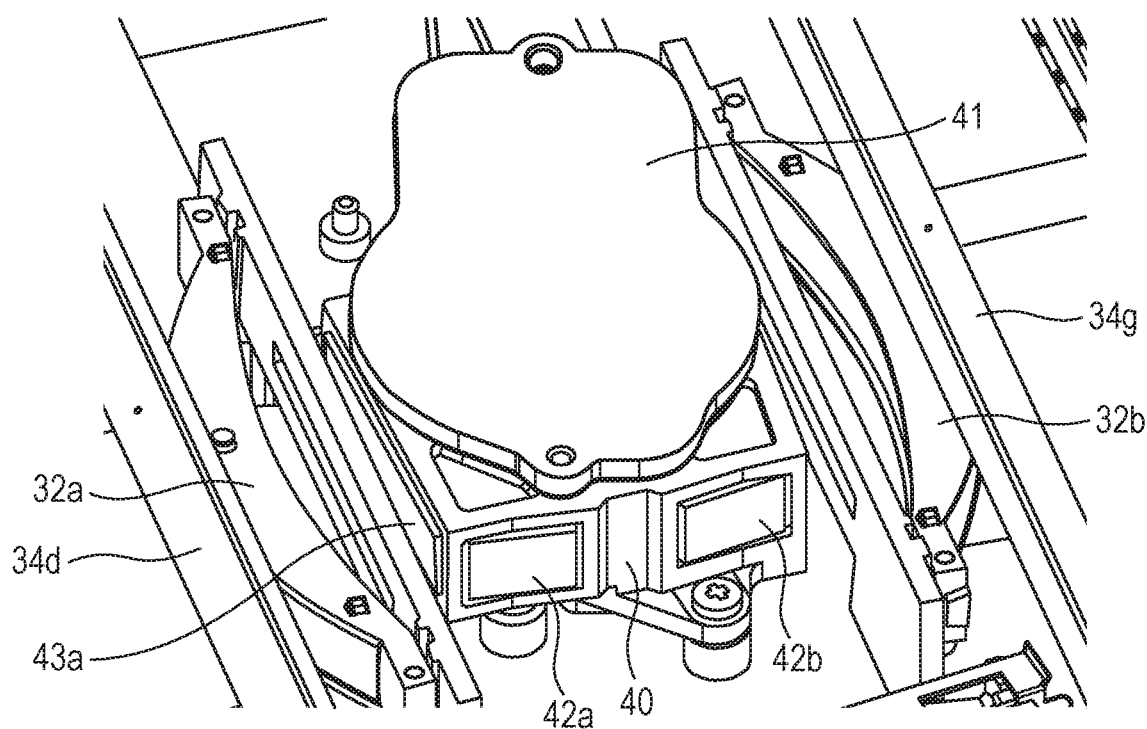
FIG. 11B is an explanatory view for illustrating the sound-insulating members of the rotary polygon mirror of the comparative example.

As a method of reducing the level of noise, for example, as illustrated in FIG. 11A and FIG. 11B, there has been known a method of covering a periphery of the rotary polygon mirror 31 with sound-insulating members 40 and 41, to thereby cause noise to be less liable to leak out. FIG. 11A is a perspective view in which the sound-insulating member 41 being a lid portion provided on an upper portion of the sound-insulating member 40 is removed for convenience of description. FIG. 11B is a perspective view for illustrating a state in which the periphery of the rotary polygon mirror 31 is sealed by assembling the sound-insulating member 41 to the sound-insulating member 40. The sound-insulating member 40 is fixed to a mounting seat surface, which is provided in the casing 35 and serves as a mounting portion for the sound-insulating member 40, by fastening members such as screws. In the sound-insulating member 40, transparent windows 42a and 42b are provided at portions through which laser light emitted from each of the light source units 31a and 31b passes at the time of proceeding to the rotary polygon mirror 31, and serve as light transmitting members for allowing passage of the laser light. At portions through which laser light having been deflected by the rotary polygon mirror 31 passes at the time of proceeding, there are provided a transparent window 43a and a transparent window 43b (on a side opposed to the transparent window 43a) which serve as light transmitting members for allowing passage of the laser light. The sound-insulating members 40 and 41 are provided as a single unit (pair of sound-insulating members). Therefore, in the following description, the sound-insulating member 40 and the sound-insulating member 41 are collectively referred to as "sound-insulating member 40" unless the sound-insulating members 40 and 41 are particularly distinguished. In this embodiment, the transparent windows 42a and 43a are described as different members. However, the transparent windows 42a and 43a may be an integrated transparent window. Similarly, in this embodiment, the transparent windows 42b and 43b are described as different members. However, the transparent windows 42b and 43b may be an integrated transparent window. The transparent windows 42a, 43a, 42b, and 43b may be an integrated transparent window.

The periphery of the rotary polygon mirror 31 is sealed with the sound-insulating member 40 as illustrated in FIG. 11A and FIG. 11B. With this configuration, an arrangement space for optical members in which imaging lenses and reflective mirrors are arranged and an arrangement space for a rotary polygon mirror in which a rotary polygon mirror configured to deflect light beams from light sources is arranged can be separated. As a result, large noise generated in the vicinity of the rotary polygon mirror 31 is confined in the sound-insulating member 40. With this configuration, propagation of noise can be prevented, thereby being capable of reducing the level of noise emitted from the optical scanning apparatus 20. Meanwhile, addition of the sound-insulating member 40 increases the cost. Therefore, it is not preferred, in terms of cost, to assemble the same sound-insulating member 40 to a product which involves drive of the rotary polygon mirror 31 with low-speed rotation and has a low level of noise. Therefore, even when the same casing 35 is employed, the sound-insulating member 40 is provided to a product which involves drive of the rotary polygon mirror 31 with high-speed rotation, and the sound-insulating member 40 is not provided to a product which involves drive of the rotary polygon mirror 31 with low-speed rotation. In this embodiment, illustration is made of a configuration in which all of the optical members including lenses and reflective mirrors configured to introduce light beams having been deflected by the rotary polygon mirror 31 to the photosensitive drums are arranged on an outer side of the sound-insulating member 40. However, the embodiment is not limited to this configuration. In the embodiment, it is only necessary that part of the plurality of optical members configured to introduce light beams having been deflected by the rotary polygon mirror 31 to the photosensitive drums, that is, at least one of the imaging lenses and the reflective mirrors be provided on the outer side of the sound-insulating member 40. In other words, in the embodiment, some of the plurality of optical members configured to introduce light beams having been deflected by the rotary polygon mirror 31 to the photosensitive drums, that is, at least one of the imaging lenses and the reflective mirrors may be provided on an inner side of the sound-insulating member 40.

With the condition that the same casing 35 is used, the sound-insulating member 40 is not used for a product which involves low-speed rotation of the rotary polygon mirror 31, and the sound-insulating member 40 is used only for a product which involves high-speed rotation. In this case, due to the influence of the transparent windows 42 and 43 provided at portions of the sound-insulating member 40 where the laser light passes, optical deviation occurs. FIG. 12A and FIG. 12B are explanatory schematic views for illustrating an optical change which occurs depending on presence or absence of the transparent windows 42 and 43 provided at portions where the laser light passes to the rotary polygon mirror 31. In FIG. 12A and FIG. 12B, illustrations of the transparent windows 42 and 43 provided to the sound-insulating member 40 which seals the vicinity of the rotary polygon mirror 31 and the scanning optical system are simplified. Further, in FIG. 12A and FIG. 12B, for description of a relationship of imaging in the sub-scanning direction (direction that is orthogonal to the main scanning direction of scanning the photosensitive drum 21) of the laser light, cross sections in the sub-scanning direction are illustrated.

FIG. 12A is a schematic view for illustrating optical paths of laser light emitted from each of the light source units 31a and 31b in a case without a surface tilt of the rotary polygon mirror 31. For the transparent windows 42 and 43, glass or plastic (resin) is normally used as the light transmitting member. The scanning optical system is configured to image the laser light on the photosensitive drum 21. For simplification of the drawing, the first imaging lenses 32a and 32b and the second imaging lenses 33a to 33d are illustrated as single imaging lenses 32 and 33. The imaging lenses are optically designed so that the reflective surface of the rotary polygon mirror 31 and the surface of the photosensitive drum 21 have a relationship of conjugation. Specifically, the imaging lenses are optically designed so that a spot having substantially the same diameter as a spot on the reflective surface of the rotary polygon mirror 31 is reproduced on the surface of the photosensitive drum 21 (photosensitive member surface). Further, in FIG. 12A, an optical path La1 represents an optical path in a case in which the sound-insulating member is not provided. An optical path La2 represents an optical path after the optical path La1 is refracted by the transparent window 42. An optical path La3 represents an optical path after the optical path La2 is refracted by the transparent window 43. The dot line in the center of FIG. 12A represents an optical axis of the laser light.

As illustrated in FIG. 12A, when the sound-insulating member 40 is not provided to the rotary polygon mirror 31, laser light emitted from a light source is imaged on the photosensitive drum 21 by the optical path La1. With the configuration using the sound-insulating member 40, the laser light is refracted at the transparent window 42 which is provided at an entry portion of the sound-insulating member 40. Therefore, the optical path of the laser light is shifted from the optical path La1 to the optical path La2, with the result that focal point deviation with a deviation amount L2 in the proceeding direction of the laser light occurs on the rotary polygon mirror 31. Then, the laser light having been deflected by the rotary polygon mirror 31 passes through the transparent portion 43 provided at an exit portion of the sound-insulating member 40, with the result that the laser light is refracted. Therefore, the optical path of the laser light is shifted from the optical path La2 to the optical path La3. As a result, the deviation amount further increases, and thus focal point deviation with a deviation amount L1 (L2<L1) in the proceeding direction of the laser light occurs on the photosensitive drum 21.

FIG. 12B is a schematic view for illustrating optical paths of laser light emitted from each of the light source units 31*a* and 31*b* in a case with the surface tilt of the rotary polygon mirror 31. In FIG. 12B, states of the surface tilt of the rotary polygon mirror 31 are indicated by "31 (WITHOUT SURFACE TILT)" and "31 (WITH SURFACE TILT)". In FIG. 12B, the surface of the photosensitive drum 21 in a case without the surface tilt is indicated by "21 (WITHOUT SURFACE TILT)". In FIG. 12B, the surface of the photosensitive drum 21 in a case with the surface tilt, that is, a conjugation position of the photosensitive drum 21 with respect to a reflective surface position of the rotary polygon mirror 31 in the case with the surface tilt is indicated by "21 (WITH SURFACE TILT)". In FIG. 12B, an optical path Lb1 represents an optical path in a case in which the sound-insulating member 40 is not provided. An optical path Lb2 represents an optical path after the optical path Lb1 is refracted by the transparent window 42. An optical path Lb3 represents an optical path after the optical path Lb2 is refracted by the transparent window 43. The dot line in the center of FIG. 12B represents an optical axis of the laser light. Other configurations are the same as those of FIG. 12A.

Unlike the state illustrated in FIG. 12A, when the sound-insulating member 40 is not provided to the rotary polygon mirror 31, the optical path Lb1 is not symmetrical to the optical axis due to the surface tilt as illustrated in FIG. 12B. However, the laser light emitted from the light source is imaged on the photosensitive drum 21 by the optical path Lb1. In the configuration using the sound-insulating member 40, the laser light is refracted at the transparent window 42 provided at the entry portion of the sound-insulating member 40. Therefore, the optical path of the laser light is shifted from the optical path Lb1 to the optical path Lb2, with the result that focal point deviation with the deviation amount L2 in the proceeding direction of the laser light occurs on the rotary polygon mirror 31. The laser light having been deflected by the rotary polygon mirror 31 passes through the transparent window 43 provided at the exit portion of the sound-insulating member 40 (provided at a position corresponding to the exit surface). With this configuration, the laser light is refracted, with the result that the optical path of the laser light is shifted from the optical path Lb2 to the optical path Lb3. As a result, due to refraction by the transparent window 43 through which the laser light passes after having been deflected by the rotary polygon mirror 31, deviation in conjugate point occurs, and the deviation amount of the conjugate point is (L1−L2).

Embodiment

[Configuration of Optical Scanning Apparatus]

Figure 1:
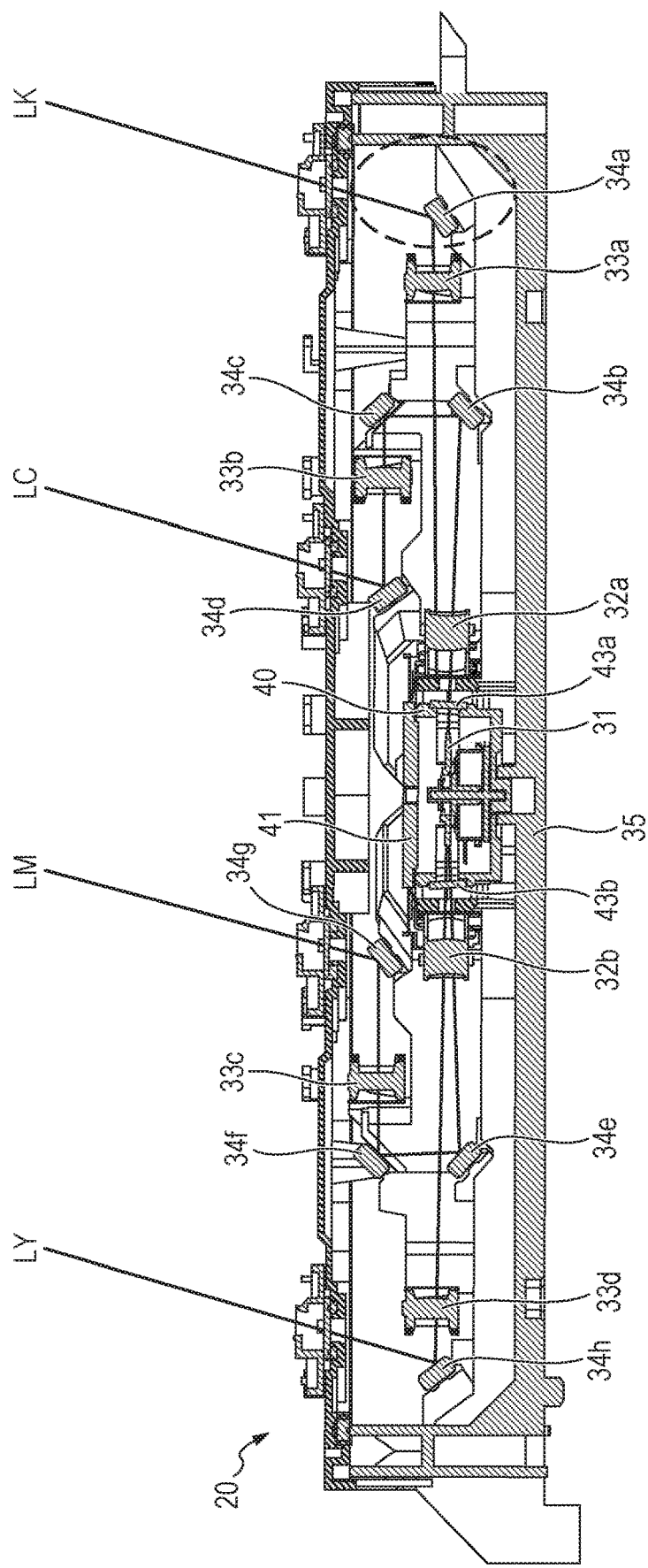
FIG. 1 is a sectional view for illustrating a configuration of an optical scanning apparatus according to an embodiment of the present invention.

FIG. 1 is a sectional view for illustrating a configuration of the optical scanning apparatus 20 which is described above with reference to FIG. 10. FIG. 1 is an illustration of a cross section of the optical scanning apparatus 20 illustrated in FIG. 10 as seen from a far side to a near side in the drawing. Each of the light source units 31*a* and 31*b* from which the laser light is emitted is provided on the far side in FIG. 1. Therefore, the light source units 31*a* and 31*b* are not illustrated in FIG. 1. In FIG. 1, components which are the same as those of FIG. 10 are denoted by the same reference symbols.

As illustrated in FIG. 1, the rotary polygon mirror 31 is provided at a central portion of the optical scanning apparatus 20. Light beams emitted from the respective light source units 31*a* and 31*b* (not shown) are deflected by the rotary polygon mirror 31. The light beams having been deflected by the rotary polygon mirror 31 proceed via the transparent windows 43*a* and 43*b* of the sound-insulating member 40 and via the imaging lenses 32*a*, 32*b*, and 33*a* to 33*d* and the reflective mirrors 34*a* to 34*h* of the scanning optical system provided on respective optical paths. The photosensitive drums 21 of the image forming portions are exposed with the light beams. In the optical scanning apparatus 20 illustrated in FIG. 1, light beams LY, LM, LC, and LK, which expose the photosensitive drums 21 of the image forming portions for yellow (Y), magenta (M), cyan (C), and black (K) in the order from the optical path indicated by the solid line on the left side in FIG. 1, are emitted through an exit port formed in the casing 35. The rotary polygon mirror 31 provided at the central portion of the casing 35 is covered with the sound-insulating member 40, which is configured to reduce noise generated from the rotary polygon mirror 31, and the sound-insulating member 41 corresponding to a lid portion of the sound-insulating member 40.

[Configuration of Reflective Mirror Mounting Portion]

Figure 2:
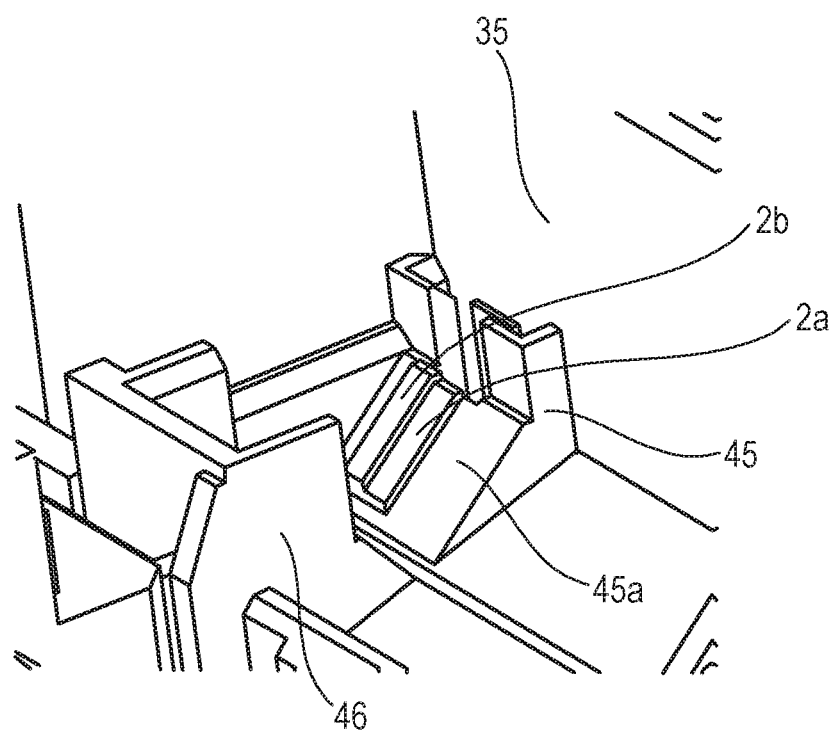
FIG. 2 is a perspective view for illustrating a reflective mirror support portion in the embodiment.

Next, description is made of a configuration of a reflective mirror mounting portion which is a support portion provided on an optical path of the laser light for exposing the photosensitive drum 21. FIG. 2 is a perspective view for illustrating the portion indicated by the broken line in FIG. 1. That is, FIG. 2 is an illustration of a reflective mirror mounting portion 45 for mounting a reflective mirror 34*a* provided on an optical path (optical path LK in FIG. 1) for exposing the photosensitive drum 21K of the image forming portion for black with light. In FIG. 2, only a periphery of the reflective mirror mounting portion 45 is illustrated for description, and the reflective mirror 34a, the imaging lens, and the fixing member are not illustrated.

The reflective mirror mounting portion 45 has an inclined surface 45a on which one end of the reflective mirror 34a is placed. On the inclined surface 45a, there are formed adjacent two mounting seat surfaces 2a and 2b (hereinafter also referred to as "seat surface 2a" and "seat surface 2b"). When the reflective mirror 34a is placed, a side of the reflective mirror 34a which is opposite to the reflective surface for reflecting the laser light, that is, a back surface of the reflective surface is brought into abutment against the seat surfaces 2a and 2b. A level difference is provided between the seat surface 2a being a first support portion and the seat surface 2b being a third support portion. The optical scanning apparatus 20 of this embodiment employs the same casing and the same imaging lens, and the sound-insulating member 40 which covers the periphery of the rotary polygon mirror 31 is selectively assembled to the sound-insulating member 40 in accordance with a printing speed of the image forming apparatus 10. In that occasion, for the purpose of correcting the focal point deviation or the conjugate point deviation which is generated when the sound-insulating member 40 is used, in this embodiment, the plurality of mounting seat surfaces for the reflective mirror are provided so as to correspond to presence or absence of the sound-insulating member 40. In the case of the optical scanning apparatus 20 in which the sound-insulating member 40 is not mounted, the reflective mirror 34a is placed on the seat surface 2b side. In the case of the optical scanning apparatus 20 in which the sound-insulating member 40 is mounted, the light beams pass through the transparent windows 43a and 43b of the sound-insulating member 40. Thus, the focal point is deviated toward the far side in the proceeding direction of the light beam as compared to the case in which the sound-insulating member 40 is not mounted. Therefore, the focal point position is adjusted (optical path length is adjusted) so that a path length of the optical scanning apparatus in which the sound-insulating member 40 is mounted is set larger than a path length of the optical scanning apparatus in which the sound-insulating member 40 is not mounted. Accordingly, the reflective mirror 34a is placed on the seat surface 2a side having a level difference for correcting the deviation amount of the focal point position. A length (actual distance) of the optical path in a case in which a medium (except for air) which allows the light beam to pass therethrough is not present on the optical path of the light beam is defined as a path length. An optical distance in the case in which the medium (except for air) which allows the light beam to pass therethrough is present on the optical path of the light beam is defined as an optical path length. The optical path length is determined in consideration of a refractive index of the interposed medium and the path length of passage through the medium.

At a position opposed to the reflective mirror mounting portion 45, there is provided a projecting portion 46 which has an upright wall for supporting a pressing spring 4 (see FIG. 8A to FIG. 8D). The pressing spring 4 is inserted between the projecting portion 46 and the reflective mirror mounting portion 45, and is configured to press the reflective mirror 34a. Another reflective mirror mounting portion (not shown) to which the reflective mirror 34a is mounted is provided so as to correspond to another end of the reflective mirror 34a having the one end placed on the reflective mirror mounting portion 45. At a position opposed to the reflective mirror mounting portion, there is provided a projecting portion (not shown) having the same shape as that of the projecting portion 46. The reflective mirror mounting portion which is provided so as to correspond to the another end of the reflective mirror 34a is symmetrical to the reflective mirror mounting portion 45 with respect to a center of the reflective mirror 34a in a longitudinal direction. Further, the reflective mirror mounting portion has two seat surfaces having a level difference corresponding to the mounting seat surfaces 2a and 2b of the reflective mirror mounting portion 45. Those two seat surfaces are symmetrical to the mounting seat surfaces 2a and 2b of the reflective mirror mounting portion 45. That is, the seat surface of the reflective mirror mounting portion on a side close to the center of the reflective mirror 34a, which is provided so as to correspond to the another end of the reflective mirror 34a, is a second support portion which corresponds to the mounting seat surface 2a of the reflective mirror mounting portion 45. Meanwhile, the seat surface of the reflective mirror mounting portion on a side far from the center of the reflective mirror, which is provided so as to correspond to the another end of the reflective mirror 34a, is a fourth support portion which corresponds to the mounting seat surface 2b of the reflective mirror mounting portion 45. That is, the seat surface 2a being the first support portion and the seat surface being the second support portion and corresponding to the seat surface 2a are positioned between the seat surface 2b being the third support portion and the seat surface being the fourth support portion and corresponding to the seat surface 2b. Therefore, the seat surface 2b and the seat surface corresponding to the seat surface 2b protrude toward the reflective surface side of the reflective mirror to be arranged with respect to the seat surface 2a and the seat surface corresponding to the seat surface 2a. A length of the reflective mirror 34a in the longitudinal direction (span) is larger in the case in which the reflective mirror 34a is placed on the mounting seat surface 2b than in the case in which the reflective mirror 34 is placed on the mounting seat surface 2a.

[Relationship Between Output Speed and Rotation Speed of Rotary Polygon Mirror]

Figure 3:
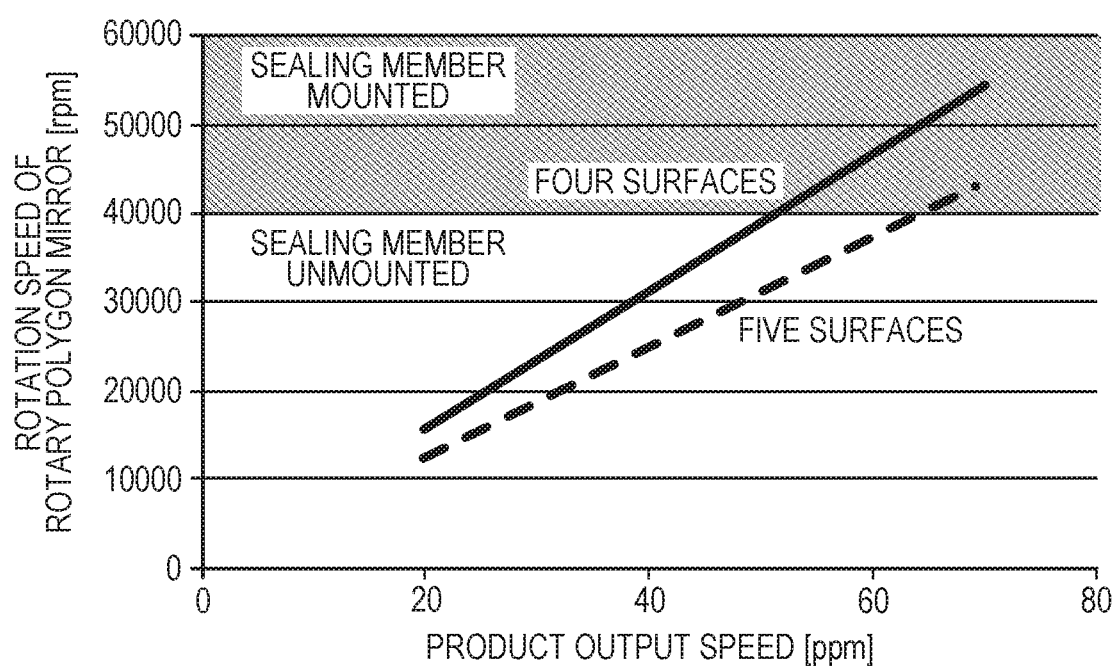
FIG. 3 is a graph for showing a relationship between a product output speed and a rotation speed of a rotary polygon mirror in the embodiment.

Next, with reference to FIG. 3, description is made of a relationship between a product output speed, which is a throughput of the image forming apparatus per unit time, and a rotation speed of the rotary polygon mirror 31 of the optical scanning apparatus 20. FIG. 3 is a graph for showing one example of a relationship between a product output speed of the image forming apparatus 10 and a rotation speed of the rotary polygon mirror 31 of the optical scanning apparatus 20. In FIG. 3, the horizontal axis represents a product output speed (unit: ppm) being the number of outputs per minute, and the vertical axis represents a rotation speed (unit: rpm) of the rotary polygon mirror 31. The graph indicated by the solid line in FIG. 3 represents a relationship between the product output speed and the rotation speed of the rotary polygon mirror 31 in a case in which the rotary polygon mirror 31 has a four-surface configuration. The graph indicated by the broken line represents a relationship between the product output speed and the rotation speed of the rotary polygon mirror 31 in a case in which the rotary polygon mirror 31 has a five-surface configuration (see FIG. 11A). As shown in FIG. 3, as the product output speed becomes higher, the rotation speed of the rotary polygon mirror 31 also increases. Therefore, in the optical scanning apparatus 20 of this embodiment, when the rotation speed of the rotary polygon mirror 31 exceeds a predetermined rotation speed, a periphery of the rotary polygon mirror 31 is covered with the sound-insulating member 40 to suppress noise generated from the rotary polygon mirror 31. In FIG. 3, there is shown an example in which a configuration of the optical scanning apparatus 20 is changed so as to have the sound-insulating member 40 mounted therein for a product in which the rotation speed of the rotary polygon mirror 31 exceeds 40,000 rpm (gray-colored region in FIG. 3).

[Selection of Mounting Seat Surface for Reflective Mirror Depending on Presence or Absence of Sound-Insulating Member]

Next, detailed description is made of a changed portion depending on presence or absence of the sound-insulating member 40. Now, as one example, description is made using the optical scanning apparatus 20 in a case in which the rotary polygon mirror 31 illustrated in FIG. 11A has five surfaces. As shown in FIG. 3, in an image forming apparatus having a product output speed of 70 ppm, the rotation speed of the rotary polygon mirror 31 exceeds 40,000 rpm being the predetermined rotation speed, and hence the optical scanning apparatus 20 to be mounted requires the sound-insulating member 40. In this case, in this embodiment, the periphery of the rotary polygon mirror 31 is sealed with the sound-insulating member 40 illustrated in FIG. 11A. Therefore, passage of the laser light through each of the transparent windows 43a and 43b being the light transmitting members provided to the sound-insulating member 40 causes deviation in conjugate point. In the scanning optical system in this embodiment, the optical path length of the incident optical system from each of the light source units 31a and 31b, which are configured to output the laser light, to the rotary polygon mirror 31 is about 170 mm. An optical path length from a deflection surface of the rotary polygon mirror 31 to an image central portion (center portion in the main scanning direction) of the photosensitive drum 21 is about 250 mm. Addition of the sound-insulating member 40 causes deviation of about 0.7 mm in each of the optical path length in the incident optical system to the rotary polygon mirror 31 and the optical path length in the scanning optical system. This deviation occurs in a direction in which the optical path length becomes larger (proceeding direction of the laser light).

In the product having a product output speed of 70 ppm, it is required that, in order to correct the deviation in optical path length, a length of an actual physical optical path (path length) rather than an optical distance from the light source to the photosensitive drum 21 be set relatively larger. Therefore, the mounting seat surface 2a side illustrated in FIG. 2 is used for the mounting seat surface for installation of the reflective mirror. In a product having a product output speed of less than 70 ppm and not using the sound-insulating member 40, deviation in optical path length which occurs in the case of using the sound-insulating member 40 does not occur. Therefore, the mounting seat surface 2b may be used for the mounting seat surface on which the reflective mirror is installed. Among the mounting seat surfaces of the reflective mirror mounting portion, any one of the seat surfaces is used in accordance with presence or absence of the sound-insulating member 40, and both of the seat surfaces are not used in the same product. Also with regard to the reflective mirror mounting portion corresponding to the another end of the reflective mirror illustrated in FIG. 2, a seat surface which is symmetrical to the mounting seat surfaces 2a and 2b of FIG. 2 with respect to the center of the reflective mirror in the longitudinal direction is formed. Thus, the reflective mirror supported by the mounting seat surface 2a and the reflective mirror supported by the mounting seat surface 2b have different lengths in the longitudinal direction of the reflective mirror.

[Mounting of Reflective Mirror]

Figure 4A:
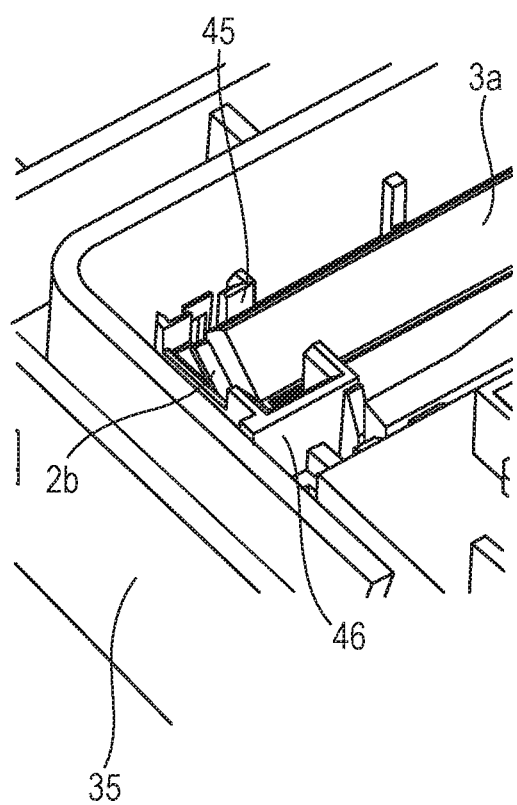
FIG. 4A is a view for illustrating a state in which a reflective mirror in the embodiment is assembled.
Figure 4B:
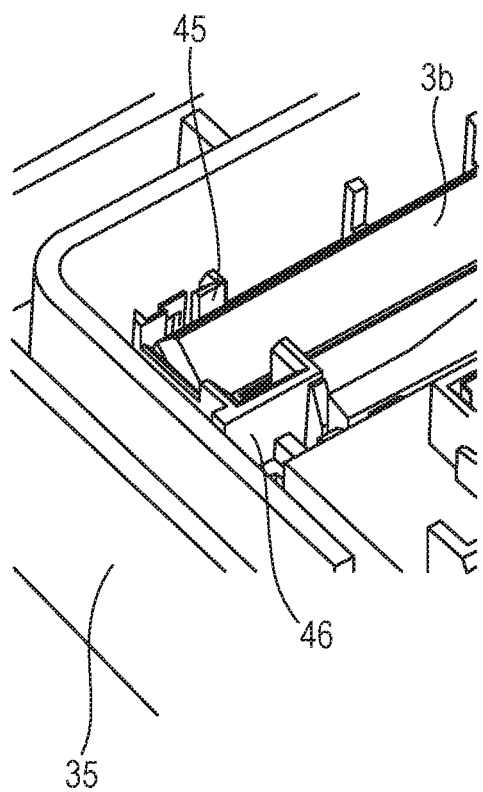
FIG. 4B is a view for illustrating a state in which the reflective mirror in the embodiment is assembled.

FIG. 4A and FIG. 4B are perspective views for illustrating states in which the reflective mirror 34a is assembled to the mounting seat surface of the reflective mirror mounting portion 45 described with reference to FIG. in accordance with presence or absence of the sound-insulating member 40. FIG. 4A is a perspective view for illustrating a state in which the reflective mirror 34a having a length in the longitudinal direction corresponding to the mounting seat surface 2a illustrated in FIG. 2 (hereinafter referred to as "reflective mirror 3a") is assembled. FIG. 4B is a perspective view for illustrating a state in which the reflective mirror 34a having a length in the longitudinal direction corresponding to the mounting seat surface 2b illustrated in FIG. 2 (hereinafter referred to as "reflective mirror 3b") is assembled. Description is made of the reflective mirrors 3a and 3b with reference to FIG. 4A and FIG. 4B, and hence the pressing springs for fixing the reflective mirrors 3a and 3b are not illustrated. The reflective mirrors 3a and 3b illustrated in FIG. 4A and FIG. 4B are reflective mirrors which are prepared in accordance with the mounting seat surfaces 2a and 2b on which the reflective mirrors 3a and 3b are installed. The reflective mirror 3a to be installed on the mounting seat surface 2a and the reflective mirror 3b to be installed on the mounting seat surface 2b are different in distance (span) between mounting seat surfaces on which both end portions of the reflective mirror are placed. Therefore, the lengths of the reflective mirrors 3a and 3b in the longitudinal direction are also different.

Similarly to the reflective mirror mounting portion 45 illustrated in FIG. 2, the reflective mirror mounting portion to which the reflective mirror is mounted in the casing 35 is provided at each position corresponding to an optical path of the laser light for exposing the photosensitive drum 21 of the image forming portion for each color. That is, a location at which the reflective mirror can be installed is the reflective mirror mounting portion which is arranged in the proceeding direction of the laser light from each of the transparent windows 43a and 43b being exit surfaces from which the laser light having been deflected by the rotary polygon mirror 31 is emitted. Thus, the reflective mirror mounting portion is not limited to the reflective mirror mounting portion which is closest to the photosensitive drum 21. For example, on the optical path (optical path LK in FIG. 1) for exposing the photosensitive drum 21K of the image forming portion for black with light, there is provided the reflective mirror mounting portion 45 to which the reflective mirror 34a described with reference to FIG. 2 is mounted. Similarly, on the optical path (optical path LY in FIG. 1) for exposing the photosensitive drum 21Y of the image forming portion for yellow with light, there is provided a reflective mirror mounting portion to which the reflective mirror 34h is mounted. Further, on the optical path (optical path LM in FIG. 1) for exposing the photosensitive drum 21M of the image forming portion for magenta with light, there are provided reflective mirror mounting portions to which the reflective mirrors 34e, 34f, and 34g are mounted. Further, on the optical path (optical path LC in FIG. 1) for exposing the photosensitive drum 21C of the image forming portion for cyan with light, there are provided reflective mirror mounting portions to which the reflective mirrors 34b, 34c, and 34d are mounted.

[Configuration of Reflective Mirror Mounting Portion]

The seat surface being the support portion for the reflective mirror on the reflective mirror mounting portion described with reference to FIG. 2 is brought into contact with the back side of the reflective surface of the reflective mirror to support the reflective mirror. Among the reflective mirror mounting portions to which the reflective mirrors are mounted, for example, like the reflective mirror mounting portions for supporting the reflective mirrors 34c and 34f (FIG. 1), there is given a reflective mirror mounting portion having a seat surface for supporting the surface of the reflective mirror on the reflective surface side.

Figure 5A:
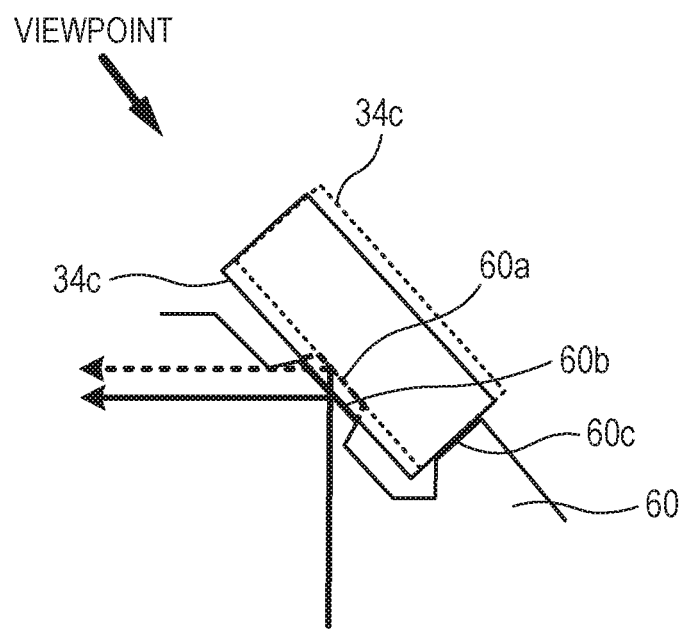
FIG. 5A is a schematic view for illustrating the reflective mirror support portion in the embodiment.
Figure 5B:
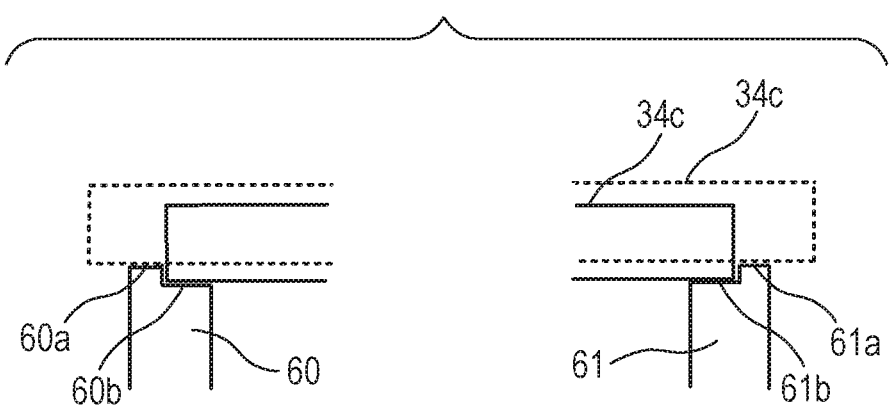
FIG. 5B is a schematic view for illustrating the reflective mirror support portion in the embodiment.

FIG. 5A and FIG. 5B are schematic views for illustrating a configuration of the reflective mirror mounting portion having a seat surface for supporting a surface of the reflective mirror on the reflective surface side. Now, description is made of a configuration of reflective mirror mounting portions 60 and 61 to which the reflective mirror 34c is mounted. The reflective mirror mounting portion to which the reflective mirror 34f is mounted also has the same configuration as the reflective mirror mounting portions 60 and 61 to which the reflective mirror 34c is mounted. FIG. 5A is a schematic view for illustrating a configuration of the reflective mirror mounting portion 60. FIG. 5B is a schematic view for illustrating the configuration of the reflective mirror mounting portions 60 and 61 when the reflective mirror mounting portions 60 and 61 are seen from the viewpoint (direction of the arrow) illustrated in FIG. 5A. In FIG. 5A and FIG. 5B, for description, only peripheries of the reflective mirror mounting portions 60 and 61 are illustrated, and fixing members are not illustrated.

In FIG. 5A, the reflective mirror mounting portion has adjacent two mounting seat surfaces 60a and 60b (hereinafter also referred to as "seat surface 60a" and "seat surface 60b") on which the reflective mirror 34c is placed. The seat surface 60c is a seat surface for supporting a bottom surface of the reflective mirror 34c in a short direction when the reflective mirror 34c is placed on the reflective mirror mounting portion 60. When the reflective mirror 34c is mounted to the seat surface 60a (illustrated with broken lines in FIG. 5A) and the seat surface 60b (illustrated with solid lines in FIG. 5A), the same side as the reflective surface for reflecting the laser light, that is, a surface of the reflective mirror 34c on the reflective surface side is brought into abutment against the seat surface 60a and the seat surface 60b. In FIG. 5A, the broken lines represent the reflective mirror 34c placed on the seat surface 60a, and the solid lines indicate the reflective mirror 34c placed on the seat surface 60b. The solid line arrow represents an optical path which is given when the reflective mirror 34c is placed on the seat surface 60b. The broken line arrow represents an optical path which is given when the reflective mirror 34c is placed on the seat surface 60a. Between the seat surface 60a being the first support portion and the seat surface 60b being the third support portion, the level difference is provided similarly to the seat surfaces 2a and 2b of the reflective mirror mounting portion 45 in FIG. 2.

In the optical scanning apparatus 20 of this embodiment, the same casing 35 and the same imaging lenses 32 and 33 are used, and the sound-insulating member 40 which covers a periphery of the rotary polygon mirror 31 is selectively assembled in accordance with a printing speed of the image forming apparatus 10. In that occasion, for the purpose of correcting the focal point deviation or the conjugate point deviation which is generated when the sound-insulating member 40 is used, in this embodiment, the plurality of mounting seat surfaces for the reflective mirror are provided so as to correspond to presence or absence of the sound-insulating member 40. In the case of the optical scanning apparatus 20 in which the sound-insulating member 40 is not mounted, the reflective mirror 34c is mounted on the seat surface 60b side. In the case of the optical scanning apparatus 20 in which the sound-insulating member 40 is mounted, the light beams pass through the transparent windows 43a and 43b of the sound-insulating member 40. Thus, the focal point position is deviated in the proceeding direction of the light beams as compared to the case in which the sound-insulating member 40 is not mounted. Therefore, in order to extend the optical path length and adjust the focal point position, the reflective mirror 34c is placed on the seat surface 60a side at which the level difference for correcting the deviation amount of the focal point position is provided.

FIG. 5B is a schematic view for illustrating a configuration of the reflective mirror mounting portions 60 and 61 for supporting end portions of the reflective mirror 34c in the longitudinal direction. There is provided the reflective mirror mounting portion 61 for supporting another end of the reflective mirror 34c so as to correspond to another end of the reflective mirror 34c having one end supported by the reflective mirror mounting portion 60, which is described with reference to FIG. 5A. The reflective mirror mounting portion 61 has two seat surfaces 61a and 61b corresponding to the mounting seat surfaces 60a and 60b of the reflective mirror mounting portion 60 and having a level difference. The seat surfaces 61a and 61b are symmetrical to the mounting seat surfaces 60a and 60b of the reflective mirror mounting portion 60 over with respect to the center of the reflective mirror 34c in the longitudinal direction. The seat surface 60b being the third support portion and the seat surface 61b being the fourth support portion are positioned between the seat surface 60a being the first support portion and the seat surface 61a being the second support portion. Contact portions at which the seat surface 60a and the seat surface 61a are held in contact with the reflective mirror 34c project toward the back surface side of the reflective surface of the reflective mirror to be arranged thereon with respect to contact portions at which the seat surface 60b and the seat surface 61b are held in contact with the reflective mirror 34c. A length (span) of the reflective mirror 34c in the longitudinal direction is larger in the case in which the reflective mirror 34c is placed on the mounting seat surfaces 60a and 61a than in the case in which the reflective mirror 34c is placed on the mounting seat surfaces 60b and 61b.

The relative position deviation amount of the mounting seat surface for the reflective mirror provided to the reflective mirror mounting portion is set so that the deviation amount in optical distance (optical path length) caused by the position deviation amount is substantially equal to the deviation amount of the focal point or the deviation amount of the conjugate point. As described above, for the reflective mirror mounting portion in this embodiment, a plurality of mounting seat surfaces for the reflective mirror, which are arranged after the laser light having been deflected by the rotary polygon mirror 31 passes through each of the transparent windows 43a and 43b, are prepared. With this configuration, the change in optical path length which is caused in accordance with presence or absence of the transparent windows is absorbed. As a result, through absorption of the optical path length of the laser light at the reflective mirror portion which is arranged after passage through the transparent windows 43a and 43b, the absorption can be performed without causing optically adverse effects.

[Angle of Reflective Mirror Mounting Seat Surface]

Figure 6A:
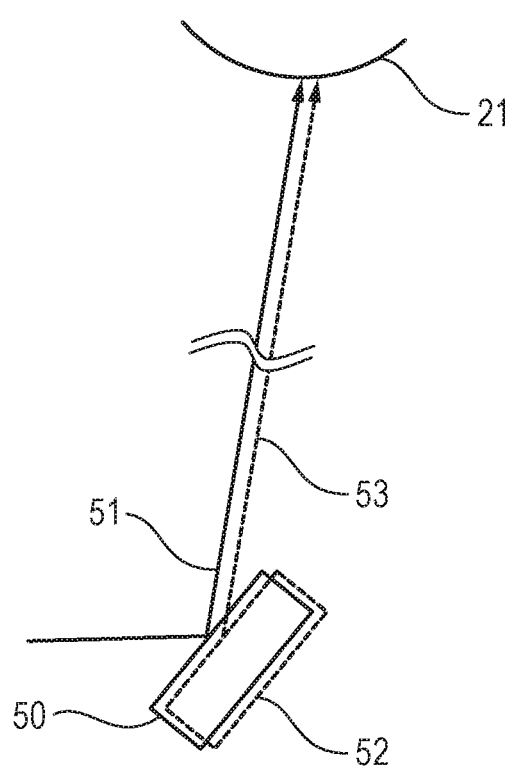
FIG. 6A is a view for illustrating a relationship between an angle of a mounting seat surface and a scanning position of a photosensitive drum in the embodiment.
Figure 6B:
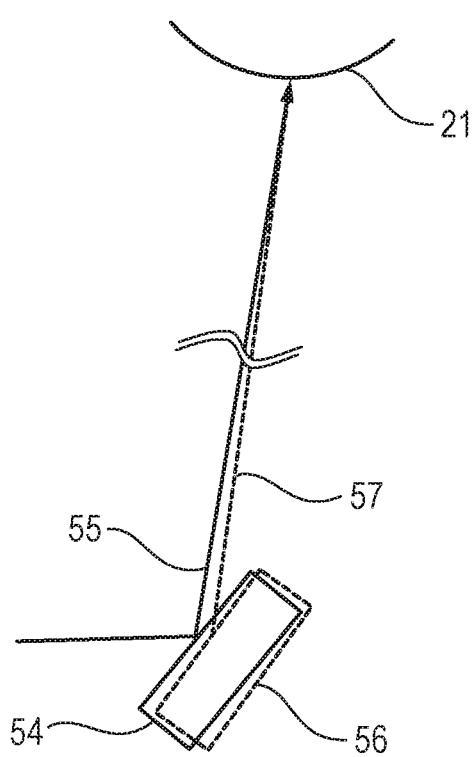
FIG. 6B is a view for illustrating a relationship between an angle of the mounting seat surface and a scanning position of the photosensitive drum in the embodiment.

With regard to the reflective mirror mounting seat surfaces 2a and 2b in this embodiment, reflection angles of laser light to be reflected with respect to incident angles of the laser light which enters the reflective mirrors to be placed thereon are not limited to the same reflection angle, and may be different reflection angles. That is, it is not always required that the inclination angles of the reflective mirror mounting seat surfaces 2a and 2b be equal to each other. FIG. 6A is a schematic view for illustrating the reflective mirror mounting seat surfaces 2a and 2b which are provided so that the reflection angles with respect to the laser light which enters the reflective mirror placed on the reflective mirror mounting seat surfaces 2a and 2b are set to the same reflection angle. FIG. 6B is a schematic view for illustrating the reflective mirror mounting seat surfaces 2a and 2b which are provided so that the reflection angles are set to the different angles.

FIG. 6A is a schematic view for illustrating a case in which inclinations of the mounting seat surfaces 2a and 2b are substantially parallel to each other. In FIG. 6A, a reflective mirror 50 indicated by the solid lines represents a cross section of the reflective mirror 50 placed on the mounting seat surface 2b. An optical path 51 indicated by the solid line represents an optical path in which the laser light having entered the reflective mirror 50 is reflected and proceeds to the photosensitive drum 21. A reflective mirror 52 indicated by the broken lines represents a cross section of the reflective mirror 52 placed on the mounting seat surface 2a. An optical path 53 indicated by the broken line represents an optical path in which the laser light having entered the reflective mirror 52 placed on the mounting seat surface 2a is reflected and proceeds to the photosensitive drum 21. As is apparent from FIG. 6A, the inclination angles of the mounting seat surfaces 2a and 2b are substantially equal. Therefore, when the mounting seat surfaces are moved in parallel, the light reflected from the reflective mirror is also shifted in parallel. Therefore, deviation occurs in an exposure position on the photosensitive drum 21 to which the laser light is irradiated.

FIG. 6B is a schematic view for illustrating a case in which an inclination angle of each of the mounting seat surfaces 2a and 2b to which the reflective mirror is mounted is set to a different angle. In FIG. 6B, a reflective mirror 54 indicated by the solid lines represents a cross section of the reflective mirror 54 placed on the mounting seat surface 2b. An optical path 55 indicated by the solid line represents an optical path in which the laser light having entered the reflective mirror 54 is reflected and proceeds to the photosensitive drum 21. A reflective mirror 56 indicated by the broken lines represents a cross section of the reflective mirror 56 placed on the mounting seat surface 2a. An optical path 57 indicated by the broken line represents an optical path in which the laser light having entered the reflective mirror 56 placed on the mounting seat surface 2a is reflected and proceeds to the photosensitive drum 21. FIG. 6B is an illustration of a case in which, even when an inclination angle of the seat surface on which the reflective mirror is mounted is different, an angle or a shift amount of the seat surface is adjusted so that the exposure position on the photosensitive drum 21 is substantially at the same position, that is, an image point substantially matches. In terms of optical performance, there is no difference even when any configuration is employed. When there is a sufficient space in the vicinity of the exposure position on the photosensitive drum 21, the configuration of FIG. 6A may be employed. When there is no sufficient space in the periphery of the exposure position on the photosensitive drum, the configuration of FIG. 6B may be employed. As described above, when a plurality of fixing seat surfaces for the reflective mirror provided in accordance with presence or absence of the light transmitting member have the same angle, light reflected on the reflective mirror may have deviation in irradiation position on the photosensitive drum 21 in accordance with deviation in relative position of each seat surface.

In some cases, the laser light is blocked by peripheral components, and the photosensitive drum 21 cannot be exposed with light. Therefore, in this embodiment, an angle of each seat surface is relatively changed so that the irradiation position on the photosensitive drum 21 is set to substantially the same position, thereby preventing blocking of light by the peripheral components.

[Relative Shift Amount of Reflective Mirror Mounting Portion]

Description is made of a relative shift amount of the reflective mirror mounting portion. As described above with reference to FIG. 12A and FIG. 12B, the focal point deviation amount caused depending on presence or absence of the sound-insulating member 40 for sealing the rotary polygon mirror and the deviation amount of the conjugate point with respect to the rotary polygon mirror 31 are different. Therefore, the position deviation amounts and angles of the two seat surfaces, which are relative shift amounts of the reflective mirror mounting portion, cannot be set to an optimum shift amount for both the deviation in focal point and the deviation in conjugate point. Therefore, in actuality, it is required that the optimum shift amount be selected at the time of design in accordance with an optical system. In this embodiment, a plurality of conditions are given, and description is made of configurations suitable for those conditions.

FIG. 7 is a schematic view for illustrating the laser light in a periphery of the photosensitive drum 21, which is illustrated in FIG. 12B for description of the optical path of the laser light emitted from each of the light source units 31a and 31b in the case with the surface tilt of the rotary polygon mirror 31. In FIG. 7, the optical path Lb1 represents an optical path which is given in the case in which the sound-insulating member 40 is not provided. The optical path Lb2 represents an optical path which is given after the optical path Lb1 is refracted by the transparent window 42. The optical path Lb3 represents an optical path which is given after the optical path Lb2 is refracted by the transparent window 43. The dot line in the central portion of FIG. 7 represents an optical axis of the laser light.

The deviation amount L1 illustrated in FIG. 7 represents a focal point deviation amount caused by the transparent windows 42 and 43 of the sound-insulating member 40. A position deviated from the surface of the photosensitive drum 21 in the proceeding direction of the laser light by the deviation amount L1 represents a position at which the focal point is most favorable when the sound-insulating member 40 is installed. At this position, the focal point is favorable, and hence a sharp image can be formed. However, the imaging point is moved by the surface tilt in the sub-scanning direction, with the result that banding occurs when a degree of the surface tilt is large. The deviation amount (L1−L2) represents a deviation amount in conjugate point deviation caused by the transparent window 43 of the sound-insulating member 40, that is, a conjugate point which is given when the transparent window 43 is provided. The position which is deviated from the surface of the photosensitive drum 21 by the distance (L1−L2) in the proceeding direction of the laser light is a position of an end position of the optical path length by which an imaging gravity center in the sub-scanning direction is on the optical axis, regardless of the surface tilt amount of the rotary polygon mirror 31. This position represents the optical path length which suppresses at most the occurrence of coarseness and fineness of scanning lines in the rotation direction of the photosensitive drum 21 (sub-scanning direction)

(occurrence of banding in an image in the sub-scanning direction) due to deviation in optical path caused by the surface tilt.

As a first configuration, description is made of a case of shifting in accordance with the deviation amount of the conjugate point. Deviation of an exposure light beam, which is caused by the rotary polygon mirror 31 and is called "surface tilt", causes periodical unevenness in an image formed on the photosensitive drum 21. The surface tilt has a spatial frequency on an image which is determined based on the number of beams of the light source which emits laser light, the resolution, and the number of surfaces of the rotary polygon mirror 31. The surface tilt becomes larger depending on the pitches thereof, and is liable to be recognized as an image failure. Therefore, when the position or the angle of the seat surface of the reflective mirror mounting seat surface in the case of using the sound-insulating member 40 is shifted so that the optical path length is changed by the distance corresponding to the deviation amount (L1−L2) of the conjugate point illustrated in FIG. 12A and FIG. 12B, a state with an optimum surface tilt can be maintained. In this case, in the optical scanning apparatus 20, the residual difference by the deviation amount L2 occurs on the photosensitive drum 21 as the focal point deviation amount. However, as compared to the deviation amount L1 of the focal point which is caused by the sound-insulating member 40, improvement is made by the shift of the mounting seat surface. With a system in which a focal depth is secured, optical performance is not degraded by the focal point deviation by the deviation amount L2. As described above, the optical path length difference absorbed at the mounting portion for the reflective mirror is set to substantially equal to (L1−L2). With this, the deviation amount of the conjugate point caused by the light transmitting member can be absorbed, thereby being capable of maintaining a favorable surface tilt.

Next, as a second configuration, description is made of a case of shifting in accordance with the focal point deviation amount on the photosensitive drum 21. When the number of beams of the light source or the number of surfaces of the rotary polygon mirror 31 to be used in the optical scanning apparatus 20 is small, the period of the surface tilt on the image is short. Therefore, there is difficulty in recognizing the surface tilt on the image even when the surface tilt becomes somewhat larger. In an optical system having no sufficient focal depth, a spot diameter is changed by the focal point deviation. With this configuration, the electrostatic latent image becomes shallow, with the result that roughness or density unevenness may occur. In such a case, the position or angle of the seat surface in the case of using the sound-insulating member 40 is shifted so that the optical path length is changed by the distance corresponding to the deviation amount L1 of the focal point on the photosensitive drum 21 illustrated in FIG. 12A and FIG. 12B. With this configuration, the spot diameter can be maintained in an optimum state. In this case, only the deviation amount L2 of the conjugate point occurs, but the image can be maintained within the allowable range when the pitch on the image is small. As described above, the optical path length difference to be absorbed by the mounting portion for the reflective mirror is substantially matched with the deviation amount L1 being the focal point deviation amount caused by the light transmitting member. With this configuration, the focal point deviation on the photosensitive drum 21 can be suppressed.

Finally, as a third configuration, description is made of a case of shifting with focus on both the deviation amount of the conjugate point and the deviation amount of the focal point. This is a configuration of allocating the shift amount with good balance in the deviation amount of the conjugate point and the focal point deviation amount caused by the surface tilt. In this configuration, it is only required that an average shift amount of the deviation amount L1 of the focal point and the deviation amount (L1−L2) of the conjugate point, that is, (L1+(L1−L2))/2=(L1−(L2/2)) be set. In this case, characteristic values cannot be corrected to optimum values, but the shift amount can be distributed to both items. Therefore, the pitch of the surface tilt on the image can be seen relatively easier, and thus it is effective for an optical system having no sufficient focal depth. As described above, the optical path length difference to be absorbed by the mounting portion for the reflective mirror is set substantially equal to (L1−(L2/2)). With this configuration, positions can be set in consideration of both the deviation in focal point and the deviation in conjugate point which are caused by the light transmitting member, thereby being capable of distributing the focal point deviation and the surface tilt.

[Mounting Configuration of Pressing Spring]

Figure 8A:
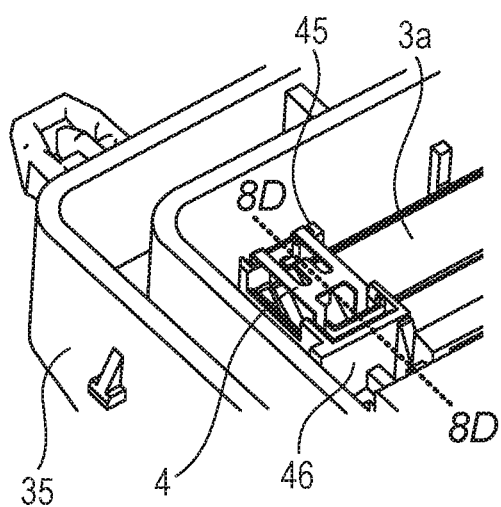
FIG. 8A is a view for illustrating a fixed state of the reflective mirror by a pressing spring in the embodiment.
Figure 8B:
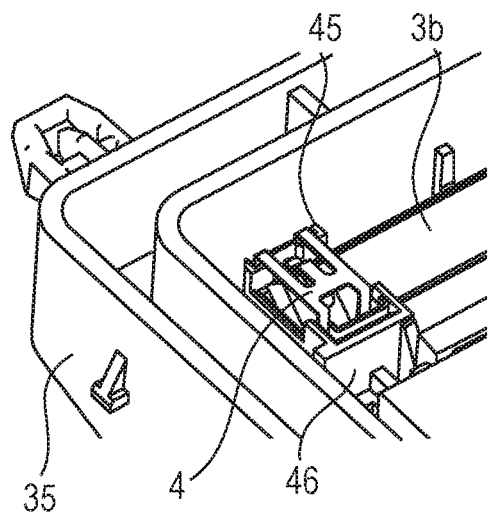
FIG. 8B is a view for illustrating a fixed state of the reflective mirror by the pressing spring in the embodiment.

Next, with reference to FIG. 8A to FIG. 8D, description is made of a mounting configuration for a pressing spring for fixing the reflective mirror. FIG. 8A to FIG. 8D include perspective views for illustrating a state in which the reflective mirror is placed on the seat surfaces of the reflective mirror mounting portion 45 illustrated in FIG. 2 and FIG. 4A and FIG. 4B and the pressing spring 4 configured to press the reflective mirror is assembled. FIG. 8A is a perspective view for illustrating a case in which the pressing spring 4 is assembled to the reflective mirror 3a placed on the seat surface 2a illustrated in FIG. 4A. FIG. 8B is a perspective view for illustrating a case in which the pressing spring 4 is assembled to the reflective mirror 3b placed on the seat surface 2b illustrated in FIG. 4B. The pressing springs 4 illustrated in FIG. 8A and FIG. 8B are the same, and a type of the pressing spring is not changed in accordance with the seat surface on which the reflective mirror is placed. Through standardization of the mounting portion for the pressing spring configured to press the mirror, the need for providing shapes in accordance with a plurality of locations is eliminated. Therefore, the freedom in design and space for the pressing spring mounting portion of the casing 35 can be sufficiently secured. When the reflective mirror is supported with a long span, the specific frequency is reduced, but becomes higher when a position apart from the support point is pressed. Therefore, the pressing spring 4 is provided so as to be opposed to the support portion on a side with a smaller span. With this configuration, when the reflective mirror is supported with a long span, the inner side with respect to the support portion is pressed, thereby being capable of suppressing reduction in specific frequency. Further, the seat surfaces on which the reflective mirrors are to be placed are provided adjacent to each other, thereby being capable of suppressing a change in specific frequency of the reflective mirror for the case of assembling the reflective mirror to the seat surface with a small span and the case of assembling the reflective mirror to the adjacent seat surface with a large span.

In this embodiment, the plurality of reflective mirror mounting seat surfaces 2a and 2b are provided in the same casing 35, and the pressing spring 4 is arranged so as to be opposed to each of the mounting seat surfaces 2a and 2b. In such a case, it is required that the pressing spring 4 which is suitable for the reflective mirrors 3a and 3b be prepared individually. A support span (length of the reflective mirror in the longitudinal direction) at both ends of the reflective mirror supported (pressed) by the pressing spring 4 differs between a case in which the reflective mirror 3a is assembled to the seat surface 2a with use of such pressing spring 4 and a case in which the reflective mirror 3b is assembled to the seat surface 2b with use of such pressing spring 4. That is, the support span of the reflective mirror 3b is longer than the support span of the reflective mirror 3a. Therefore, the specific frequencies of the reflective mirrors 3a and 3b differ. Thus, in the case of the reflective mirror 3b supported by the seat surface 2b having a large support span (length in the longitudinal direction), the specific frequency is shifted to the low-frequency side as compared to the reflective mirror 3a supported by the seat surface 2a. When the acceleration of vibration to be applied is constant, forcible displacement by vibration becomes larger as the specific frequency is smaller. It is desired that the specific frequency be larger while avoiding resonance with a peripheral vibration sources such as gears and fans.

Therefore, in this embodiment, the common pressing spring 4 is used for both the reflective mirror 3a supported by the seat surface 2a and the reflective mirror 3b supported by the seat surface 2b to press the reflective mirrors 3a and 3b. That is, for both the case of the reflective mirror 3a having the small support span and the case of the reflective mirror 3b having the large support span, the pressing spring 4 presses the reflective mirrors 3a and 3b at a position opposed to the seat surface 2a on which the reflective mirror 3a having the small support span is mounted. With this configuration, also in the case of the reflective mirror 3b having the large support span which is mounted to the seat surface 2b, the reflective mirror 3b is pressed by the pressing spring 4 at a position of the seat surface 2a having the small support span. Therefore, as compared to the case of being pressed at the position of the seat surface 2b, the specific frequency can be shifted to the high frequency side to approach the specific frequency of the reflective mirror 3a.

[Configuration of Pressing Spring]

Figure 8C:
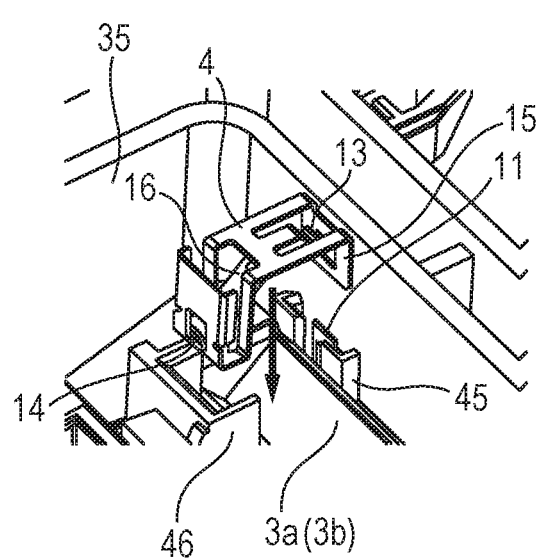
FIG. 8C is a view for illustrating the pressing spring in the embodiment.

FIG. 8C is an explanatory view for illustrating the pressing spring 4 configured to press the reflective mirrors 3a and 3b (described as "3a(3b)" in FIG. 8C). In FIG. 8C, for description, the pressing spring 4 is illustrated on a near side in the insertion direction of the pressing spring (thick arrow in FIG. 8C). In this embodiment, when the pressing spring 4 is inserted in the arrow direction to a portion between the reflective mirror mounting portion 45 and the projecting portion 46 which are provided in the casing 35, the pressing spring 4 is inserted so that a first plate portion 15 of the pressing spring 4 is inserted between the reflective mirror mounting portion 45 and a groove portion 11, thereby positioning the pressing spring 4. An engagement claw 14 is provided on the projecting portion 46 side of the pressing spring 4. The engagement claw 14 is fitted to a groove portion (not shown) formed at a location opposed to the engagement claw 14 of the projecting portion 46, thereby preventing removal of the pressing spring 4. Similarly, an engagement claw (not shown) which is similar to the engagement claw 14 is provided also at an opening portion of the first plate portion 15 in the direction of the groove portion 11. When the pressing spring 4 is inserted, the engagement claw (not shown) is fitted to the groove portion 11, thereby preventing removal of the pressing spring 4. The pressing spring 4 has a second plate portion 16 and a third plate portion 13. The second plate portion 16 is configured to press the reflective mirrors 3a and 3b. The third plate portion 13 is configured to prevent dropping of the reflective mirrors 3a and 3b.

Figure 8D:
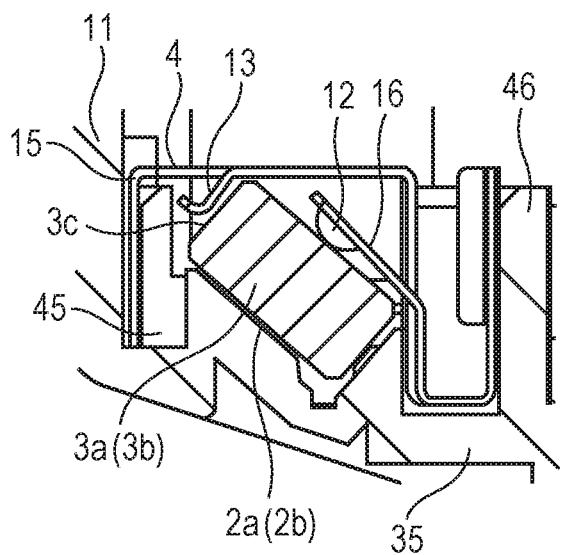
FIG. 8D is a view for illustrating a fixed state of the reflective mirror by the pressing spring in the embodiment.

FIG. 8D is a sectional view for illustrating a state in which the pressing spring 4 presses the reflective mirrors 3a and 3b (indicated as "3a(3b)" in FIG. 8D) placed on the mounting seat surfaces 2a and 2b (indicated as 2a(2b) in FIG. 8D). FIG. 8D is an illustration of a cross section taken along the line 8D-8D of FIG. 8A. From FIG. 8D, it can be seen that the pressing spring 4 is arranged opposed to the seat surface 2a. Further, it can be seen that the pressing spring 4 is inserted between the reflective mirror mounting portion 45 and the projecting portion 46 provided to the casing 35, and that the first plate portion 15 of the pressing spring 4 is inserted between the reflective mirror mounting portion 45 and the groove portion 11. The second plate portion 16 has an abutment portion 12 being a pressing portion formed into a substantially semispherical shape and configured to press the reflective mirrors 3a and 3b. The abutment portion 12 is brought into abutment against the reflective surfaces of the reflective mirrors 3a and 3b to press (urge) the reflective mirrors 3a and 3b in the direction of the mounting seat surfaces 2a and 2b. On an upper portion 3c side (upper portion side) in a short direction orthogonal to the reflective surfaces of the reflective mirrors 3a and 3b of the pressing spring 4, there is provided the third plate portion 13. The third plate portion 13 being a prevention portion has a shape obtained by bending an end portion of the pressing spring 4. The third plate portion 13 is provided as a retainer for preventing removal of the reflective mirrors 3a and 3b from the mounting seat surfaces 2a and 2b. The third plate portion 13 is not held in abutment against the reflective mirrors 3a and 3b and does not urge the reflective mirrors 3a and 3b.

FIG. 8D is a sectional view for illustrating the pressing spring 4 in a case in which the reflective mirror 3a is fixed to the mounting seat surface 2a. It is similar in the case in which the reflective mirror 3b is assembled to the mounting seat surface 2b, and the pressing spring 4 is inserted into the groove portion at the same position in the casing 35. At this time, the assembly position of the reflective mirror 3b is slightly different because the position of the seat surface is different. However, a sufficient displacement amount of the pressing spring 4 is secured. Therefore, the position at which the abutment portion 12 presses the reflective mirror 3b only slightly moves, and hence it can be used without any problem. When the mounting seat surface 2b is used, and the abutment portion 12 presses the reflective mirror 3b at a position at which the abutment portion 12 is opposed to the mounting seat surface 2b, the specific frequency of the reflective mirror 3b is reduced. However, the abutment portion 12 presses a position at which both ends are deviated toward an inner side (central portion side of the reflective mirror 3b in the longitudinal direction) from the mounting seat surface 2b (support portion) against which the reflective mirror 3b is brought into abutment, thereby being capable of increasing the specific frequency of the reflective mirror 3b. Therefore, a specific frequency which is equivalent to that of the configuration using the mounting seat surface 2a having a small distance between mounting seat surfaces, that is, having a small support span for supporting end portions of the reflective mirror can be maintained, and the pressing spring 4 can be used in common. The pressing spring 4 presses the reflective mirror 3b at a position not opposed to the seat surface 2b on which the reflective mirror 3b is placed. With this configuration, warpage occurs in the reflective mirror 3b, and a scanning line curve is slightly changed. However, such a phenomenon involves only a change in adjustment amount of the scanning line curve.

As described in this embodiment, the shift amount of the reflective mirror mounting portions 2a and 2b may be set so as to correspond to the deviation amount ((L1−L2)) of the conjugate point, or may be set in accordance with the deviation amount (L1) of the focal point. Further, the shift amount of the seat surfaces of the reflective mirror mounting portions 2a and 2b may be set in accordance with the average position (L1−(L2/2)) of the deviation in conjugate point and the deviation in focal point. In this embodiment, the seat surface shape of the reflective mirror mounting portion is illustrated with the seat surface on a flat plane. However, it is not particularly required that the seat surface shape be the seat surface on the flat plane. As long as the path length can be changed in accordance with seat surfaces, the shape of the seat surface may be any shape. Further, the shift amount of the seat surface of the mounting portion may differ for each image forming portion to be exposed with light. For example, the shift amount which is determined with focus on the deviation in conjugate point may be set for black (K) and cyan (C) having a low brightness, and the shift amount which is determined with focus on the focal point deviation may be set for yellow (Y) having a high brightness. In this embodiment, description is made with the optical scanning apparatus having a configuration in which the photosensitive drums 21 of the plurality of image forming portions are exposed with light by a single rotary polygon mirror. However, the configuration is not required to be limited to the configuration of this embodiment. For example, the same effect can be obtained even with the configuration of using an individual optical scanning apparatus for each color of toner.

As described above, according to this embodiment, it is possible to secure stable optical performance regardless of presence or absence of the sound-insulating member which covers the rotary polygon mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025999, filed Feb. 15, 2017, which is hereby incorporated by reference herein in its entirety.

What is claimed is:

1. A casing of an optical scanning apparatus, which is configured to accommodate a rotary polygon mirror including a plurality of reflective surfaces and configured to deflect a light beam emitted from a light source, and an optical member including at least part of an imaging lens configured to image the light beam having been deflected by the rotary polygon mirror on a photosensitive member and a reflective mirror configured to introduce the light beam having been deflected by the rotary polygon mirror to the photosensitive member, the casing comprising:
a mounting portion to which a sound-insulating member is mountable, wherein the sound-insulating member separates an arrangement space of the optical member and an arrangement space of the rotary polygon mirror, is configured to reduce propagation of sound generated by rotation of the rotary polygon mirror from the arrangement space of the rotary polygon mirror to the arrangement space of the optical member, and has a transparent window configured to allow the light beam having been deflected by the rotary polygon mirror to be emitted from the arrangement space of the rotary polygon mirror to the arrangement space of the optical member;
a first support portion and a second support portion configured to support a reflective mirror in the casing of an optical scanning apparatus on which the sound-insulating member is mounted, the first support portion being configured to support one end of the reflective mirror configured to introduce the light beam to the photosensitive member and being brought into contact with a back surface of a reflective surface of the reflective mirror, the second support portion being configured to support another end of the reflective mirror and being brought into contact with the back surface of the reflective surface of the reflective mirror; and
a third support portion and a fourth support portion configured to support a reflective mirror in the casing of an optical scanning apparatus on which the sound-insulating member is not mounted, the third support portion being configured to support one end of the reflective mirror configured to introduce the light beam to the photosensitive member and being brought into contact with a back surface of a reflective surface of the reflective mirror, the fourth support portion being configured to support another end of the reflective mirror and being brought into contact with the back surface of the reflective surface of the reflective mirror,
wherein the first support portion and the second support portion are positioned between the third support portion and the fourth support portion in a longitudinal direction of the reflective mirror to be arranged, and
wherein contact portions of the third support portion and the fourth support portion which are brought into contact with the reflective mirror protrude toward a reflective surface side of the reflective mirror to be arranged with respect to contact portions of the first support portion and the second support portion which are brought into contact with the reflective mirror so that a path length of the light beam, from the light source to a surface of the photosensitive member, which is formed by the reflective mirror supported by the first support portion and the second support portion is set longer than a path length of the light beam, from the light source to the surface of the photosensitive member, which is formed by the reflective mirror supported by the third support portion and the fourth support portion.

2. A casing of an optical scanning apparatus according to claim 1, wherein the first support portion, the second support portion, the third support portion, and the fourth support portion are formed so that the reflective surface of the reflective mirror supported by the first support portion and the second support portion and the reflective surface of the reflective mirror supported by the third support portion and the fourth support portion are substantially parallel to each other.

3. A casing of an optical scanning apparatus according to claim 2, wherein the sound-insulating member includes a further transparent window configured to allow the light beam having been emitted from the light source to enter the arrangement space of the rotary polygon mirror from an outside thereof, and
wherein, when a deviation amount of a focal point on the photosensitive member which is generated by the further transparent window configured to allow the light beam having been emitted from the light source to enter the arrangement space of the rotary polygon mirror from the outside thereof and the transparent window configured to allow the light beam having been deflected by the rotary polygon mirror to exit to the arrangement space of the optical member from the arrangement space of the rotary polygon mirror is defined as L1, a level difference between the first support portion and the third support portion and a level difference between the second support portion and the fourth support portion are substantially equal to the L1.

4. A casing of an optical scanning apparatus according to claim 2, wherein the sound-insulating member includes a further transparent window configured to allow the light beam having been emitted from the light source to enter the arrangement space of the rotary polygon mirror from an outside thereof, and wherein, when a deviation amount of a focal point on the photosensitive member which is generated by the further transparent window configured to allow the light beam having been emitted from the light source to enter the arrangement space of the rotary polygon mirror from the outside thereof and the transparent window configured to allow the light beam having been deflected by the rotary polygon mirror to exit to the arrangement space of the optical member from the arrangement space of the rotary polygon mirror is defined as L1, and a deviation amount of a focal point which is generated by the further transparent window configured to allow the light beam having been emitted from the light source to enter the arrangement space of the rotary polygon mirror from the outside thereof is defined as L2, a level difference between the first support portion and the third support portion and a level difference between the second support portion and the fourth support portion are substantially equal to (L1−L2).

5. A casing of an optical scanning apparatus according to claim 2, wherein the sound-insulating member includes a further transparent window configured to allow the light beam having been emitted from the light source to enter the arrangement space of the rotary polygon mirror from an outside thereof, and wherein, when a deviation amount of a focal point on the photosensitive member which is generated by the further transparent window configured to allow the light beam having been emitted from the light source to enter the arrangement space of the rotary polygon mirror from the outside thereof and the transparent window configured to allow the light beam having been deflected by the rotary polygon mirror to exit to the arrangement space of the optical member from the arrangement space of the rotary polygon mirror is defined as L1, and a deviation amount of a focal point which is generated by the further transparent window configured to allow the light beam having been emitted from the light source to enter the arrangement space of the rotary polygon mirror from the outside thereof is defined as L2, a level difference between the first support portion and the third support portion and a level difference between the second support portion and the fourth support portion are substantially equal to (L1−L2/2).

6. A casing of an optical scanning apparatus according to claim 1, wherein, in order to allow an image point of the light beam reflected by the reflective mirror supported by the first support portion and the second support portion and an imaging point of the light beam reflected by the reflective mirror supported by the third support portion and the fourth support portion to substantially match with each other, the first support portion, the second support portion, the third support portion, and the fourth support portion are formed so that an incident angle of the light beam to the reflective surface of the reflective mirror supported by the first support portion and the second support portion is set larger than an incident angle to the reflective surface of the reflective mirror supported by the third support portion and the fourth support portion.

7. A casing of an optical scanning apparatus according to claim 1, further comprising a pressing spring configured to assemble the reflective mirror to one of the first support portion and the third support portion or to one of the second support portion and the fourth support portion, wherein the reflective mirror is fixed by the pressing spring to one of the first support portion and the third support portion or to one of the second support portion and the fourth support portion.

8. A casing of an optical scanning apparatus according to claim 7, wherein the pressing spring configured to assemble the reflective mirror to one of the first support portion and the second support portion is the same as the pressing spring configured to assemble the reflective mirror to one of the third support portion and the fourth support portion.

9. A casing of an optical scanning apparatus according to claim 8, wherein the pressing spring includes a pressing portion, which is brought into abutment against the reflective mirror to press the reflective mirror, and wherein the pressing portion is formed at a position opposed to one of the first support portion and the second support portion.

10. A casing of an optical scanning apparatus according to claim 9, wherein the pressing spring includes a prevention portion configured to prevent removal of the reflective mirror from one of the first support portion and the third support portion or from one of the second support portion and the fourth support portion, and wherein the prevention portion is formed on an upper portion side of the reflective mirror in a short direction of the reflective mirror.

11. A casing of an optical scanning apparatus, which is configured to accommodate a rotary polygon mirror including a plurality of reflective surfaces and configured to deflect a light beam emitted from a light source, and an optical member including at least part of an imaging lens configured to image the light beam having been deflected by the rotary polygon mirror on a photosensitive member and a reflective mirror configured to introduce the light beam having been deflected by the rotary polygon mirror to the photosensitive member, the casing comprising:

a mounting portion to which a sound-insulating member is mountable, wherein the sound-insulating member separates an arrangement space of the optical member and an arrangement space of the rotary polygon mirror, is configured to reduce propagation of sound generated by rotation of the rotary polygon mirror from the arrangement space of the rotary polygon mirror to the arrangement space of the optical member, and has a transparent window configured to allow the light beam having been deflected by the rotary polygon mirror to be emitted from the arrangement space of the rotary polygon mirror to the arrangement space of the optical member;

a first support portion and a second support portion configured to support a reflective mirror in the casing of an optical scanning apparatus on which the sound-insulating member is mounted, the first support portion being configured to support one end of the reflective mirror configured to introduce the light beam to the photosensitive member and being brought into contact with a surface of the reflective mirror on a reflective surface side, the second support portion being configured to support another end of the reflective mirror and being brought into contact with the surface of the reflective mirror on the reflective surface side; and a third support portion and a fourth support portion configured to support a reflective mirror in the casing of an optical scanning apparatus on which the sound-insulating member is not mounted, the third support portion being configured to support one end of the reflective mirror configured to introduce the light beam to the photosensitive member and being brought into contact with a surface of the reflective mirror on a reflective surface side, the fourth support portion being configured to support another end of the reflective mirror and being brought into contact with the surface of the reflective mirror on the reflective surface side;

wherein the third support portion and the fourth support portion are positioned between the first support portion and the second support portion in a longitudinal direction of the reflective mirror to be arranged, and wherein contact portions of the first support portion and the second support portion which are brought into contact with the reflective mirror protrude toward a back surface side of the reflective mirror to be arranged with respect to contact portions of the third support portion and the fourth support portion which are brought into contact with the reflective mirror so that a path length of the light beam, from the light source to a surface of the photosensitive member, which is formed by the reflective mirror supported by the first support portion and the second support portion is set longer than a path length of the light beam, from the light source to the surface of the photosensitive member, which is formed by the reflective mirror supported by the third support portion and the fourth support portion.

12. An optical scanning apparatus, comprising:

a casing configured to accommodate a rotary polygon mirror including a plurality of reflective surfaces and configured to deflect a light beam emitted from a light source, and an optical member including at least part of an imaging lens configured to image the light beam having been deflected by the rotary polygon mirror on a photosensitive member and a reflective mirror configured to introduce the light beam having been deflected by the rotary polygon mirror to the photosensitive member, a mounting portion to which a sound-insulating member is mountable, wherein the sound-insulating member separates an arrangement space of the optical member and an arrangement space of the rotary polygon mirror, is configured to reduce propagation of sound generated by rotation of the rotary polygon mirror from the arrangement space of the rotary polygon mirror to the arrangement space of the optical member, and has a transparent window configured to allow the light beam having been deflected by the rotary polygon mirror to be emitted from the arrangement space of the rotary polygon mirror to the arrangement space of the optical member;

a first support portion and a second support portion configured to support a reflective mirror in the casing of an optical scanning apparatus on which the sound-insulating member is mounted, the first support portion being configured to support one end of the reflective mirror configured to introduce the light beam to the photosensitive member and being brought into contact with a back surface of a reflective surface of the reflective mirror, the second support portion being configured to support another end of the reflective mirror and being brought into contact with the back surface of the reflective surface of the reflective mirror; and a third support portion and a fourth support portion configured to support a reflective mirror in the casing of an optical scanning apparatus on which the sound-insulating member is not mounted, the third support portion being configured to support one end of the reflective mirror configured to introduce the light beam to the photosensitive member and being brought into contact with a back surface of a reflective surface of the reflective mirror, the fourth support portion being configured to support another end of the reflective mirror and being brought into contact with the back surface of the reflective surface of the reflective mirror, wherein the mounting portion, the first support portion, the second support portion, the third support portion, and the fourth support portion are formed in the casing, wherein the first support portion and the second support portion are positioned between the third support portion and the fourth support portion in a longitudinal direction of the reflective mirror to be arranged, and wherein contact portions of the third support portion and the fourth support portion which are brought into contact with the reflective mirror protrude toward a reflective surface side of the reflective mirror to be arranged with respect to contact portions of the first support portion and the second support portion which are brought into contact with the reflective mirror so that a path length of the light beam, from the light source to a surface of the photosensitive member, which is formed by the reflective mirror supported by the first support portion and the second support portion is set longer than a path length of the light beam, from the light source to the surface of the photosensitive member, which is formed by the reflective mirror supported by the third support portion and the fourth support portion.

* * * * *